United States Patent
Peer et al.

(10) Patent No.: US 7,339,717 B2
(45) Date of Patent: Mar. 4, 2008

(54) METHOD AND SYSTEM FOR USE IN OPTICAL CODE DIVISION MULTIPLE ACCESS

(75) Inventors: Avi Peer, Rehovot (IL); Barak Dayan, Tel Aviv (IL); Yaron Silberberg, Lehavim (IL); Asher A Friesem, Rehovot (IL)

(73) Assignee: Yeda Research and Development Company Ltd., Rehovot (IL)

( * ) Notice: Subject to any disclaimer, the term of this patent is extended or adjusted under 35 U.S.C. 154(b) by 193 days.

(21) Appl. No.: 10/553,319

(22) PCT Filed: Apr. 15, 2004

(86) PCT No.: PCT/IL2004/000328

§ 371 (c)(1),
(2), (4) Date: Oct. 17, 2005

(87) PCT Pub. No.: WO2004/092776

PCT Pub. Date: Oct. 28, 2004

(65) Prior Publication Data

US 2007/0110442 A1 May 17, 2007

Related U.S. Application Data

(60) Provisional application No. 60/462,708, filed on Apr. 15, 2003.

(51) Int. Cl.
 G02F 1/35 (2006.01)
 G02F 2/02 (2006.01)
 H04J 4/00 (2006.01)
(52) U.S. Cl. .................... 359/326; 372/21; 372/22; 398/78
(58) Field of Classification Search ........ 359/326–328; 372/21–23; 398/76–78
See application file for complete search history.

(56) References Cited

U.S. PATENT DOCUMENTS

| 4,866,699 | A | 9/1989 | Brackett et al. |
|---|---|---|---|
| 5,177,768 | A | 1/1993 | Crespo et al. |
| 5,784,506 | A | 7/1998 | Pfeiffer |
| 5,867,290 | A | 2/1999 | Dutt et al. |
| 6,025,944 | A | 2/2000 | Mendez et al. |
| 6,236,483 | B1 | 5/2001 | Dutt et al. |
| 2002/0126370 | A1 | 9/2002 | Broderick et al. |
| 2002/0163696 | A1 | 11/2002 | Huang et al. |
| 2003/0147655 | A1 | 8/2003 | Shattil |
| 2004/0037500 | A1* | 2/2004 | Yoo .......................... 385/31 |
| 2007/0147734 | A1* | 6/2007 | Cincotti .................. 385/37 |

OTHER PUBLICATIONS

L. Mandel and E. Wolf, Optical coherence and quantum optics, 22:1069-1108, Cambridge University Press (1995).

(Continued)

*Primary Examiner*—Hemang Sanghavi
(74) *Attorney, Agent, or Firm*—Browdy and Neimark, PLLC

(57) ABSTRACT

A method and device are provided for automatically generating a key and a conjugate key to be used in an optical code division multiple access system. The method comprises applying a down conversion process to pump input light to thereby produce down converted broadband signal and idler fields that are complex conjugates of each other. The signal and idler fields thus serve as the key and its conjugate. Also provided according to the invention is a method for use in coding/decoding a signal in an optical code division multiple access system.

60 Claims, 11 Drawing Sheets

OTHER PUBLICATIONS

G. D. Boyd and D. A. Kleinman, Parametric interaction of focused Gaussian light beams, *J. Appl. Phys.*, 39:3597-3639 (1968).

T. G. Giallorenzi and C. L. Tang, Quantum theory of spontaneous parametric scattering of intense light, *Phys. Rev.*, 166:225-233 (1968).

C. K. Hong and L. Mandel, Theory of parametric frequency down conversion of light, *Phys. Rev. A.*, 31:2409-2418 (1985).

I. Abram, R. K. Raj, J. L. Oudar and G. Dolique, Direct observation of the second-order coherence of parametrically generated light, *Phys. Rev. Lett.*, 57:2516-2519 (1986).

G. Bjork and Y. Yamamoto, Phase correlation in nondegenerate parametric oscillators and amplifiers: Theory and applications, *Phys. Rev. A.*, 37:1991-2006 (1988).

B. Huttner, S. Serunik and Y. Ben-Aryeh, Quantum analysis of light propagating in a parametric amplifier, *Phys. Rev. A.*, 42:5594-5600 (1990).

I. Abram and E. Cohen, Quantum theory for light propagation in a nonlinear effective medium, *Phys. Rev. A.*, 44:500-517 (1991).

A. Joobeur, B. E. A. Saleh, T. S. Larchuk and M. C. Teich, Coherence properties of entangled light beams generated by parametric down-conversion: Theory and experiment, *Phys. Rev. A.*, 53:4360-4371 (1996).

A. M. Weiner, Femtosecond pulse shaping using spatial light modulators, *Rev. Sci. Instrum.*, 71:1929-1960 (2000).

J. A. Salehi, A. M. Weiner and J. P. Heritage, Coherent ultrashort light pulse code-division multiple access communication systems, *Journal of Lightwave Technology*, 8:478-491 (1990).

M. E. Marhic, Coherent optical CDMA networks, *Journal of Lightwave Technology*, 11:854-863 (1993).

H. P. Sardesai, C. C. Chang and A. M. Weiner, A femtosecond code-division multiple-access communication system test bed, *Journal of Lightwave Technology*, 16:1953-1964 (1998).

H Fathallah, L. A. Rusch and S. LaRochelle, Passive optical fast frequency-hop CDMA communication system, *Journal of Lightwave Technology*, 17:397-405 (1999).

M. Kavehrad, Optical code division-multiplexed systems based on spectral encoding of noncoherent sources, *Journal of Lightwave Technology*, 13:534-545 (1995).

L. Nguyen, T. Dennis, B. Aazhang and J. F. Young, Experimental demonstrationof bipolar codes for optical spectral amplitude CDMA communication, *Journal of Lightwave Technology*, 15:1647-1653 (1997).

A. J. Mendez, R. M. Gagliardi, H. X. C. Feng, J. P. Heritage and J. M. Morookian, Strategies for realizing optical CDMA for dense, high-speed, long span, optical network applications, *Journal of Lightwave Technology*, 18:1683-1695 (2000).

Natarajan, B. et al., High-performance MC-CDMA via carrier interferometry codes, *IEEE Trans. Veh Tech.*, 50(6)1344-1353 (Nov. 2001).

Pe'er Avi et al., Optical direct sequence spread spectrum and code division multiplexing using broadband, parametrically generated light, *Journal of Lightwave Technology*, 22(6)1-9 (Jun. 2004).

Novero, C., "Biphoton Electromagnetic Fields and their Applications"; The Radio Science Bulletin, No. 304, Mar. 2003, pp. 5-16, XP002402230.

\* cited by examiner (GENERAL ART)

(GENERAL ART)

METHOD AND SYSTEM FOR USE IN OPTICAL CODE DIVISION MULTIPLE ACCESS

FIELD OF THE INVENTION

This invention is generally in the field of optical communications and relates to an optical method and system for code division multiple access (CDMA), as well as to a source for broadband down converted light suitable to be used in CDMA.

LIST OF REFERENCES

The following references are considered to be pertinent for the purpose of understanding the background of the present invention:

1. Andrew J. Viterbi, "*CDMA: Principles of Spread Spectrum Communication*", Addison-Wesley Wireless Communications (1995);
2. Y. R. Shen, "*Principles of Nonlinear Optics*", John Wiley & Sons (1984);
3. A. Yariv, "*Optical Electronics*", 4th Ed., Ch. 8, pp. 258-308, Saunders College Publishing (1991);
4. L. Mandel and E. Wolf, "*Optical Coherence and Quantum Optics*", Ch. 22, pp. 1069-1108, Cambridge University Press (1995);
5. G. D. Boyd and D. A. Kleinman, "Parametric Interaction of Focused Gaussian Light Beams", J. Appl. Phys., 39, 3597 (1968);
6. T. G. Giallorenzi and C. L. Tang, "Quantum Theory of Spontaneous Parametric Scattering of Intense Light", Phys. Rev., 166, 225 (1968);
7. C. K. Hong and L. Mandel, "Theory of parametric frequency down conversion of light", Phys. Rev. A. 31, 2409 (1985);
8. I. Abram, R. K. Raj, J. L. Oudar and G. Dolique, "Direct Observation of the Second-Order Coherence of Parametrically Generated Light", Phys. Rev. Lett. 57,2516 (1986);
9. G. Bjork and Y. Yamamoto, "Phase Correlation in Nondegenerate Parametric Oscilators and Amplifiers: Theory and Applications", Phys. Rev. A. 37, 1991 (1988);
10. B. Huttner, S. Serulnik and Y. Ben-Aryeh, "Quantum Analysis of Light Popagating in a Parametric Amplifier", Phys. Rev. A. 42, 5594 (1990);
11. I. Abram and E. Cohen, "Quantum theory for light propagation in a nonlinear effective medium", Phys. Rev. A. 44, 500 (1991);
12. A. Joobeur, B. E. A. Saleh, T. S. Larchuk and M. C. Teich, "Coherence properties of entangled light beams generated by parametric down-conversion: Theory and experiment", Phys. Rev. A. 53, 4360 (1996);
13. A. M. Weiner, "Femtosecond pulse shaping using spatial light modulators", Rev. Sci. Instrum. 71, 1929-1960 (2000);
14. J. A. Salehi, A. M. Weiner and J. P. Heritage, "Coherent ultrashort light pulse code-division multiple access communication systems", Journal of Lightwave Technology 8, 478-491 (1990);
15. M. E. Marhic "Coherent optical CDMA networks", Journal of Lightwave Technology 11, 854-863 (1993);
16. H. P. Sardesai, C. C. Chang and A. M. Weiner, "A femtosecond code-division multiple-access communication system test bed", Journal of Lightwave Technology 16, 1953-1964 (1998);
17. H. Fathallah, L. A. Rusch and S. LaRochelle, "Passive optical fast frequency-hop CDMA communication system", Journal of Lightwave Technology 17, 397-405 (1999);
18. M. Kavehrad, "Optical code division-multiplexed systems based on spectral encoding of noncoherent sources", Journal of Lightwave Technology 13, 534-545 (1995);
19. L. Nguyen, T. Dennis, B. Aazhang and J. F. Young, "Experimental demonstration of bipolar codes for optical spectral amplitude CDMA communication", Journal of Lightwave Technology 15, 1647-1653 (1997);
20. A. J. Mendez, R. M. Gagliardi, H. X. C. Feng, J. P. Heritage and J. M. Morookian, "Strategies for realizing optical CDMA for dence, high-speed, long span, optical network applications", Journal of Lightwave Technology 18, 1683-1695 (2000).

BACKGROUND OF THE INVENTION

Code Division Multiple Access (CDMA) is a well-known scheme for multiplexing communication channels that is based on the method of direct sequence spread spectrum [1]. CDMA is often incorporated into electronic communication networks, especially in cellular communication, and is considered to be superior to other traditional multiplexing schemes, such as Time Division Multiple Access (TDMA) wherein the entire bandwidth is available to a channel for a short slice of time and Frequency Division Multiple Access (FDMA) wherein only a part of the bandwidth is available to a channel all the time.

In CDMA, the entire bandwidth is available to all channels all the time. Each channel has a unique key that identifies it, thereby enabling an information receiver to discriminate between the channels. Such a key is a pseudo-noise sequence with a bandwidth that is much larger than that of the input data. In electronic communications, the key sequence is known in advance at both the transmitter and the receiver sides.

FIGS. 1A-1C schematically illustrate the CDMA operation principle. FIG. 1A shows a CDMA transmitter scheme: a transmitter multiplies an input data signal by a key sequence, thus spreading the spectrum of the input data signal and causing it to appear as noise in itself. FIG. 1B shows a CDMA receiver scheme: to extract the data "out of the noise", the received output is multiplied by the conjugate key sequence (the key itself if the key sequence is real). FIG. 1C shows the CDMA spectral characteristic. It is clear that if the receiver key is not the correct one, or if it is not well synchronized with the transmitter, the multiplication by the conjugate key sequence does not reveal the data and only yields a broadband noise-like result.

Thus, many channels can be multiplexed over the same bandwidth by using a different key for each channel. The effect of all other channels on a given channel is reflected only in the noise level at the receiver. Hence, keys with good auto-correlation and cross-correlation properties are to be used in order to minimize the noise level. Ideally, the key should imitate the correlation properties of band-limited white noise and should be as long as possible.

CDMA has several advantages over conventional methods. First, CDMA is well adapted to dynamic changes of the number of simultaneously operating channels. Specifically, when one channel becomes inactive, the other channels benefit from the fact that the noise level is reduced. Thus, an allocated channel in CDMA that is not transmitting at a given time, automatically "frees its space" to other channels that need the bandwidth at that time. Second, CDMA is inherently flexible to dynamic changes in the bit rate and the quality of service (signal to noise ratio) of any channel without affecting the total amount of data transmitted by all the channels. This is due to the fact that in CDMA, the resource allocated per channel is power (as opposed to time or bandwidth in other methods). Hence, if a channel is allowed to transmit more power, it can either improve the quality of service or increase the bit rate of that channel. Consequently, this shared resource (power) can be dynamically allocated between the channels, and any channel can dynamically trade bit rate for quality of service and vice versa at a given power. Third, in CDMA, all channels are equivalent, so the quality of service is that of the average channel, while in other methods, the quality of service is dictated by the worse channel.

In optical communication, the available optical bandwidth is much larger than what can be supported by current electronic modulators. Thus, in order to utilize efficiently the available bandwidth, optical multiplexing of several electronic channels is required. The CDMA approach is thus most attractive for this purpose, and attempts have been made to incorporate optical CDMA into optical communication networks [14-20]. Various solutions for the optical CDMA schemes have also been disclosed in the following patent publications: U.S. Pat. No. 4,866,699, U.S. Pat. No. 5,177,768, U.S. Pat. No. 5,867,290, U.S. Pat. No. 6,236,483, U.S. 2002/0163696; WO 00/29887; U.S. 5,784,506; U.S. Pat. No. 6,025,944.

The major problem for obtaining optical CDMA is that of generating the pseudo-noise key. Since the key should be much broader in bandwidth than the data, and since the data bandwidth in optical communication is already close to the limit that electronic modulators can support, it is impossible to generate the key electronically and it is necessary to generate the key optically. The many attempts to solve this problem can be divided to two categories—a coherent approach and an incoherent approach. The coherent approach [14-16] starts from a broadband coherent source, i.e. a mode locked laser that emits transform-limited pulses, where the phase of all frequencies is known to be zero. The key for each channel is then generated by actively shaping the phases of the different frequencies in a unique manner through some kind of a pulse-shaping device, which deforms the pulse to mimic a pseudo-noise burst. At the receiver system, a shaper performs the inverse shaping to recreate the original transform limited pulse, which is then detected. This approach suffers from sensitivity to dispersion and to non-linear effects in the fiber, and more important, from the fact that a lot of the flexibility of CDMA is lost due to the limitations imposed by active pulse shaping (e.g., the total number of channels is limited by the number of pixels of the pulse shaper and the lowest effective bit rate per channel is limited by the spectral resolution of the shaper).

The incoherent approach (with its many versions) [15, 17-20] involves an incoherent broadband source. Although such a source emits "true noise", the phase of the emitted field is not known, so only intensity manipulations are possible. This makes the incoherent approach robust in the sense that it is relatively immune to phase changes due to propagation effects. However, since the incoherent approach is inherently unipolar, the cross correlation of different keys cannot average out to zero. Thus, the existence of many channels contributes not only noise, but also background DC intensity, which causes the signal to noise ratio and the performance to deteriorate severely [15-20]. For this reason, the capacity of incoherent CDMA systems is inherently and significantly lower than that of coherent systems ($\sqrt{N}$ channels compared to N channels in the coherent approach).

The known CDMA techniques utilize complicated algorithms to pre-design practical keys that approximate the characteristics of the desired ideal white-noise key. These approximations are usually constrained by other design considerations, for example, the tradeoff between key length and design simplicity, yielding a non-optimal result.

SUMMARY OF THE INVENTION

There is a need in the art to facilitate optical CDMA by providing a novel key generation method and system, and multiplexer/demultiplexer systems utilizing the same.

The present invention provides a complete scheme for optical CDMA, including an optical method for the generation of a CDMA key and its conjugate, and for multiplexing/demultiplexing of data channels.

According to the technique of the present invention, an ideal CDMA key and its conjugate are generated automatically via the physical process of down conversion consisting of generating two broadband fields that are complex conjugates of each other. Such a process may for example be parametric down conversion, namely, pumping a non-linear optical medium to emit two broadband output light fields—signal and idler, that are complex conjugates of each other.

The term "down conversion" used herein signifies any physical process involving the emission of two broadband light fields called "signal field" and "idler field" that are complex conjugates of each other. This is a known process in which a pair of correlated photons is produced, such that the sum of their energies is well defined, although the energy of each photon is undefined. Examples of such a physical process include two photon emission, and parametric non-linear interactions, such as three waves mixing (parametric down conversion), four waves mixing, etc. A medium capable of carrying out the down conversion process serves as a source for generating simultaneously both a broadband noise and its complex conjugate that can be used later as the CDMA key and its conjugate. Accordingly, the term "up conversion" used herein signifies a physical process of a kind inverse to the down conversion process as herein defined, e.g., two photon absorption, parametric up conversion or higher order parametric non-linear interactions.

Thus, the present invention provides a novel approach for optical direct sequence spread spectrum communication, based on the complementary processes of broadband parametric down conversion and up-conversion. With parametric down conversion a narrowband CW (Continuous Wave) optical field is transformed into two CW broadband white noise fields that are complex conjugates of each other. These noise fields are exploited as the key and conjugate key in optical direct sequence spread spectrum communication. The inverse process of parametric up-conversion is then used for multiplying the key by the conjugate key at a receiver side, in order to extract the transmitted data. According to this technique, an ideal white noise key is automatically generated, leading to high capacity versatile CDMA configurations. Both the broadband white noise and its complex conjugate are generated simultaneously. It should be understood that for CDMA it is not necessary that the key be previously known. Indeed, as long as both the key and the conjugate key are generated together, one can transmit the conjugate key along with the data to the receiver (at the cost of half the bandwidth). Then, the process of parametric up-conversion (also known as sum frequency generation) is exploited to optically multiply the key and its conjugate key at the receiver.

The parametric down conversion and parametric up conversion processes were widely investigated over the last 35 years and many devices based on these processes were developed, such as optical parametric oscillators (OPO) and optical parametric amplifiers (OPA). Theoretical treatment of these processes was given in both the classical and quantum mechanical frameworks [2-12]. The signal and idler frequencies produced by a non-linear medium (usually a crystal) are those that are phase matched to the pump (the phase velocity of the signal-idler pair is equal to the phase velocity of the pump). The phase matching situation in a crystal can be controlled by tuning the propagation direction of light in the medium or by tuning the temperature of the crystal, thus controlling the emitted signal and idler frequencies. In situations when a broad bandwidth of signal-idler frequency pairs is phase matched to the pump, then the down conversion process can produce broadband signal and idler. Since the non-linear interaction of parametric down conversion can be stimulated, a non-linear medium that is pumped by the pump light will perform as an amplifier for both its signal and its idler output frequencies.

The present invention takes advantage of the special phase and amplitude relations between the optical fields that participate in the process of parametric down conversion [2] for optical generation of the CDMA key and its conjugate. The down converted light is composed of broadband CW white-noise signal and idler that are complex. conjugates of each other, which is the required condition for the generation of a CDMA key. The inverse process of parametric up conversion (also known as sum frequency generation) can thus be used for optically multiplying the key and its conjugate at the receiver side.

A CDMA transmitter within the scheme of the present invention thus utilizes a source of two broadband fields that are complex conjugates. Accordingly, all that is required for a CDMA receiver in the present scheme is an inverse physical process (e.g., two photon absorption or higher order parametric non-linear interactions), Moreover, it is not necessary that the process used for transmitting and receiving be the same. It is plausible that the transmitter will be based on two photon emission and the receiver on parametric up conversion.

The optical CDMA scheme of the present invention presents some kind of a hybrid between the coherent and incoherent approaches that alleviates some limitations of both. The scheme of the present invention utilizes a coherent approach in the sense that it relies on the coherent phase relation between the signal and idler components (the key and its conjugate), so that the capacity is comparable to that of the coherent approach. On the other hand, the key is a true white noise that is passively generated, minimizing non-linear effects and preserving the full flexibility of CDMA.

According to one broad aspect of the present invention, a method is provided for automatically generating a key and a conjugate key to be used in an optical code division multiple access system. The method comprises applying a down conversion process to pump input light to thereby produce the broadband down converted signal and idler fields that are complex conjugates of each other, said signal and idler fields serving as the key and its conjugate.

The down conversion process consists of passing the pump light through a non-linear optical medium, either with or without a cavity for the down converted light, thus generating the down converted light fields (signal and idler).

Generally, any suitable non-linear medium (typically a crystal) may be used as a source of such a key and its conjugate. In order to make this process more effective, a singly- or doubly-resonant cavity can be used, formed by a non-linear optical medium between two mirrors (Optical Parametric Oscillator). Preferably, a novel OPO configuration developed by the inventors is used, wherein means are provided within the cavity for suppressing mode competition in the cavity in order to provide broad bandwidth signal and idler fields.

According to another aspect of the invention, a method is provided for use in an optical code division multiple access (CDMA) system, the method comprising: applying a down conversion process to a light channel that is to be used for carrying data from a data transmitting system to a data receiving system, said down conversion of the light channel automatically producing broadband signal and idler light fields that are complex conjugates of each other and therefore serve as a key and its conjugate, thereby enabling data modulation of at least one of the signal and idler fields and processing them together by applying an up conversion process to thereby extract the data.

The down conversion process aimed at producing the signal and idler fields of the channel may be carried out in a data transmitting system, where one of these fields is then modulated with respective data Alternatively, the down conversion process is carried out in a data receiving system, and one of the signal and idler fields is transmitted to a data transmitting system to undergo data modulation.

According to yet another aspect of the present invention, there is provided a method for use in an optical code division multiple access (CDMA) system, the method comprising at least one of the following:

applying a down conversion process to a light channel that is to be used for carrying data from a data transmitting system to a data receiving system, said down conversion of the light channel automatically producing broadband signal and idler light fields that are complex conjugates of each other and therefore serve as a key and its conjugate, thereby enabling modulation of at least one of the signal and idler fields with said data and processing the signal and idler fields together to extract the data; and applying an up conversion process to data-carrying light, containing down conversion signal and idler fields presenting an optical channel, thereby restoring light indicative of the data channel in a data receiving system.

According to yet another aspect of the invention, a method is provided for producing an optical channel in an optical code division multiple access (CDMA) system. The method comprises:

(i) applying a down conversion process to input light, to be used for carrying data from a data transmitting system to a data receiving system, said down conversion process producing down converted signal and idler light fields that are complex conjugates of each other and therefore present a key and its conjugate;

(ii) uniquely affecting a spectral phase of at least one of the signal and idler fields to thereby define a unique phase relation between the signal and idler fields, thereby enabling extraction of data by utilizing an up conversion process.

This phase effect or phase manipulation can be a simple relative delay or material dispersion or a general spectral phase filtering applied to the signal and/or idler field by use of pulse shaping techniques. Considering the down conversion process at the receiver side, the transmitted one of the fields is uniquely phase effected due to a predefined distance between the data receiving and data transmitting systems. The other field undergoes such a unique phase affecting at the receiving system (using an inverse phase effect value), and the two fields (the data modulated field returned from the data transmitting system and the other field phase affected at the data receiving system) then undergo up conversion.

Either one of the signal and idler fields, or both of them, can be modulated in accordance with data to be carried by the optical channel. The modulation can be applied to the respective field either prior to or after said field is phase-affected.

In order to decode the channel at the receiver side, a spectral phase effect (manipulation) is applied to at least one of the signal and idler fields to thereby restore the phase relation and enable the up conversion process. Generally, this spectral phase effect is inverse to the effect applied while coding the light channel. For example, if a relative delay is applied to one of the signal and idler fields while coding the light channel, the decoding utilizes an inverse delay applied to the other field. The resulting up converted light is then detected in order to retrieve the data.

According to yet another aspect of the invention, a method is provided of multiplexing optical channels comprising:

producing N optical channels, $N \geq 1$, the optical channel being represented by a pair of down converted signal and idler light fields that are complex conjugates of each other and present a key and its conjugate, thereby enabling modulation of the optical channel in accordance with corresponding data to be carried by said optical channel;

applying to at least one of the signal and idler fields of the same channel a unique phase effect value to thereby define a unique phase relation between the signal and idler fields for the channel, thereby enabling demultiplexing of light in a data receiving system to extract a specific channel by utilizing the respective unique phase effect and an up conversion process.

If delay is the chosen phase manipulation, then the difference between the unique delay values associated with different channels is to be longer than the correlation time of the broadband signal and idler components.

The N optical channels may be produced such that they all share the same pair of signal and idler fields, e.g. by splitting the output of a single source to N channels, or by seeding N sources by one noise source, thus causing all to generate the same signal and idler light fields. Alternatively, the N optical channels may be produced such that each channel has its own set of signal and idler light fields, e.g. by pumping N uncorrelated sources to thereby produce N pairs of the signal and idler light components, respectively. Depending on the phase matching type of the source(s) (collinear or non-collinear), the system may and may not comprise a frequency filter for spatially separating between the down converted signal and idler fields. Data modulation is applied to either one of the signal and idler fields of each channel, or both of them.

The demultiplexing of received light for extracting therefrom a specific channel comprises: affecting a phase of at least one of the signal and idler fields in the received light to restore a phase relation between the signal and idler components of said specific channel; applying the up conversion process to the resulting signal and idler fields, to thereby enable extraction of said specific channel (by using an appropriate frequency filter, if necessary); and optionally, further affecting a phase of at least one of the signal and idler fields in order to leave the situation unchanged for following receivers.

As indicated above, since the efficiency of down conversion in one pass through a non-linear medium is generally very low, it is preferable to perform this process inside a resonant cavity (OPO) in order to achieve high conversion efficiencies at low thresholds. This cavity can be either singly or doubly resonant (i.e., resonates only one or both of the down converted fields). Yet, when a resonant cavity is used, mode competition will narrow the bandwidth dramatically, while for the purposes of the present invention, namely, an optical CDMA scheme, as high as possible bandwidth of signal-idler pairs should preferably be provided. The present invention solves this problem by adding into the cavity the ability to control the effect of up conversion (which serves as a loss mechanism inside the cavity), in order to thereby suppress mode competition and provide the broadband down converted light components with high efficiency and low threshold. This mode competition suppression is achieved via control over the up conversion loss in an up conversion medium in the cavity. The up conversion loss in the cavity is controlled by shaping the spectral phases of the down converted light components, e.g., by introducing a relative delay or material dispersion between the down converted signal and idler fields, such that the up conversion loss in the cavity is reduced, and restoring the phase relation of the signal and idler fields such that the down conversion is not affected. If the cavity is a singly resonant cavity, the unresonated field should also be passed through the up conversion medium in the cavity in order to enable this control.

The above can be implemented by using a cavity with either one non-linear medium in a linear cavity configuration or two non-linear media in a ring or linear cavity configuration, and a phase shaper assembly. When a single non-linear medium is used, the phase shaper assembly is formed by two phase shaper units accommodated upstream and downstream of said medium, thus controlling the up conversion loss occurring in the medium when the down converted light components are propagating backwards (with respect to the pump). When two non-linear media are used, the first non-linear medium is pumped to generate down conversion, and two phase shaper units at opposite input/output sides of the second unpumped medium are used to control the up conversion loss in the second medium. It should be understood that if the singly-resonant cavity is used, the non-resonated field should also be directed into the up-conversion medium.

Preferably, when a doubly resonant cavity is used, a mechanism for actively changing the optical length of the cavity is used in order to lock the frequency of the input pump light to a mode of the cavity. The reason for this is that in a doubly resonant cavity, both the signal and the idler have a discrete, equi-spaced spectrum (longitudinal cavity modes), so the pump frequency, which is just the sum of the all the signal—idler frequency pairs, must also match to a mode of the cavity.

Thus, according to yet another aspect of the present invention, there is provided a method for producing broadband down converted light fields, the method comprising producing down converted signal and idler fields that are complex conjugate of each other by passing input light through a resonant non-linear optical arrangement, and affecting phases of down converted light fields while propagating through said arrangement to reduce an effect of up conversion for broadband oscillations of said down converted fields thereby suppressing mode competition in the cavity.

According to yet other broad aspects of the present invention, there are provided a novel source for emitting broadband spectrally correlated light (low threshold, high efficiency configuration of an optical parametric oscillator that can be useful for CDMA and other applications); and a doubly resonant non-linear optical arrangement; an optical multiplexer system; and an optical demultiplexer system.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIGS. 1A-1C schematically illustrate the general principles of the CDMA technique, wherein FIG. 1A shows a CDMA transmitter scheme; FIG. 1B shows a CDMA receiver scheme; and FIG. 1C shows the CDMA spectral characteristic;

FIGS. 2A and 2B illustrate the main principles underlying the optical CDMA key generation scheme according to one example of the present invention, wherein FIG. 2A shows the CDMA key generation performed at a transmitter side and FIG. 2B shows the key multiplication performed at a receiver side;

FIG. 7B illustrates implementation in free space and FIG. 7C illustrates implementation within a fiber;

DETAILED DESCRIPTION OF THE INVENTION

An entire CDMA scheme typically consists of the key generation, and multiplexing/demultiplexing communication channels at the data transmitting and data receiving sides.

Figure 1A:
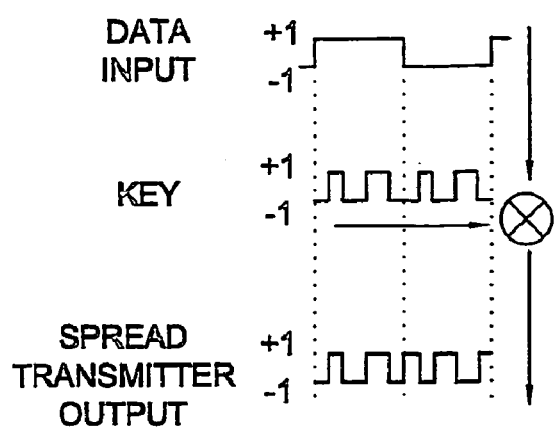
Figure 1B:
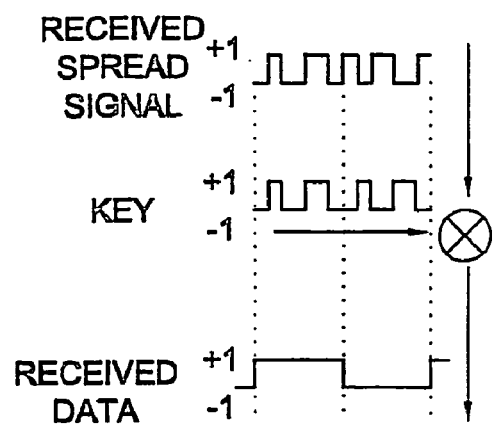
Figure 1C:
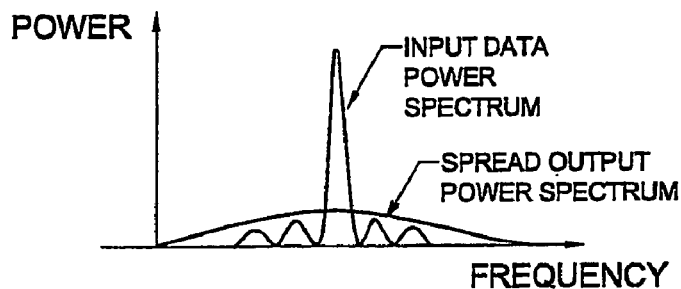
Figure 2A:
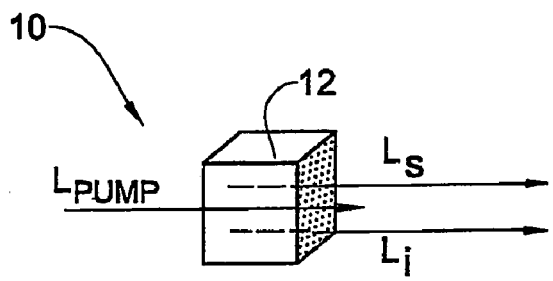
Figure 2B:
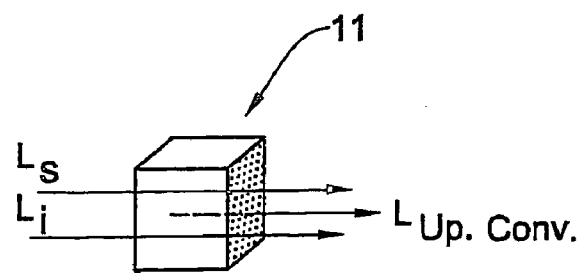
Figure 5A:
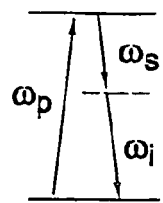
FIGS. 5A and 5B illustrate Feynmnan diagrams describing three waves mixing and four waves mixing processes, respectively, that can be used in the optical CDMA scheme as the mechanism for generating two broadband conjugate fields.
Figure 5B:
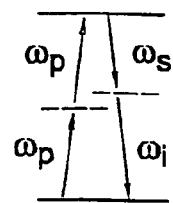

Referring to FIGS. 2A and 2B, there are schematically illustrated the main principles underlying the optical CDMA key generation scheme according to the invention enabling to generate both an ideal key (broadband noise) and its complex conjugate. FIG. 2A shows a process of parametric down conversion that is utilized for the CDMA key generation in either a data transmitting system or data receiving system, generally at 10. As indicated above, the down conversion process used in the CDMA key generation technique according to the invention is any known physical process consisting of emitting two broadband fields that are complex conjugates of each other, in which a pair of correlated photons is emitted, such that the sum of their energies is well defined although the energy of each photon is undefined (e.g., two photon emission or parametric non-linear interactions, such as three-wave mixing (parametric down conversion), four waves mixing, etc.). FIG. 2B shows the process of parametric up conversion (sum frequency generation) that is utilized for the key multiplication performed at a data receiver system 11. Generally, a physical process utilized at a receiver system of the invention is a process of the kind inverse to the down conversion process. It should also be understood that it is not necessary that the process used for transmitting and receiving be the same. For example, the transmitting may be based on two-photon emission, and the receiver—on parametric up conversion. Feynmann diagrams of several possible interactions that can be used as the basis for the invented CDMA scheme are illustrated in FIGS. 5A and 5B.

Parametric down conversion (FIG. 2A) is performed when pump light $L_{pump}$ passes through a non-linear optical medium 12 and is thus converted into a pair of output fields—a signal field $L_s$ and an idler field $L_i$ of frequencies $\omega_s$ and $\omega_i$, respectively. Such a non-linear optical medium may be a suitable crystal. The non-linear medium may be placed in a resonant cavity that serves to improve the down conversion efficiency and lower its threshold, thus forming an optical parametric oscillator (OPO). The ordinary OPO conventionally has a structure obtained by inserting a non-linear material (nonlinear crystal, such as periodically polled KTP, BBO, LBO, etc.) into an optical resonator composed of two mirrors.

For the purposes of the present invention, such a light source for producing two light fields that are complex conjugates of each other is preferably configured to emit broadband spectrally correlated down converted light. Examples of the source configurations developed by the inventors will be described further below with reference to FIGS. 6A-6B, 7A-7C, and 8.

In parametric down conversion, the pump energy $I_{pump}$ is transferred from a high frequency field (the pump field with frequency $\omega_p$ and wave vector $\overline{k}_p$), via the mediation of the non-linear crystal 12, to two lower frequency fields, namely, the signal field $L_s$ and the idler field $L_i$ (at frequencies $\omega_s$, $\omega_i$ and wave vectors $\overline{k}_s, \overline{k}_i$ respectively). When the non-linear medium is thick, this conversion can occur only if the phase matching requirements are met: i.e., energy is conserved ($\omega_p = \omega_s + \omega_i$), and momentum is conserved ($\overline{k}_p = \overline{k}_s + \overline{k}_i$ of the generated signal field $L_s$ with respect to that of the pump $L_{in}$ is undefined, but the phase of the generated signal field $L_s$ is opposite to that of the corresponding idler frequency ($\omega_i = \omega_p - \omega_s$), i.e., the amplitudes of the signal and idler are complex conjugates. Thus, due to the fact that there is no phase relation between the different signal (or idler) frequencies, but there is a special phase and amplitude relation between the corresponding signal-idler frequencies, the down converted light is composed of broadband CW white-noise signal $L_s$ and idler $L_i$ light components that are complex conjugates of each other, and therefore present a key and its conjugate to be used in the CDMA scheme.

Having generated the key and its conjugate, either one of them, e.g., the key signal $L_s$, can be externally modulated by specific information. If the down conversion process (i.e., the creation of key and its conjugate) is carried out in a data taanrnitting system, then both a data modulated field (e.g., key signal $L'_s$) and the conjugate key (idler $L_i$) can be sent to the receiver end via an optical network. If the down conversion process is carried out in a data receiver system, then only one of the down converted fields (e.g., key signal $L_s$) is sent to a data receiving system to be modulated with data and returned to the data receiver system. In order to enable channel multiplexing/demultiplexing, the key (or the conjugate) is specifically encoded. These features will be described further below with reference to FIGS. 3A-3E.

As shown in FIG. 2B, in the receiver system 11, the multiplication of received light by the conjugate key is carried out. This is implemented by applying an up conversion process (also known as sum frequency generation) to the signal and idler fields $L_s$ and $L_i$, namely by passing the received light through a non-linear medium 12.

The process of parametric up conversion is symmetrically inverse to the process of parametric down conversion, i.e., consists of energy transfer from two input low frequency fields $L_s$ and $L_i$ to an output field $L_{up\text{-}conv}$ of a high frequency, which is equal to the sum of the two low frequencies. In this process, the phase of the generated output field $L_{up\text{-}conv}$ at the sum frequency is equal to the sum of the phases of the two low frequency fields. Mathematically, this is equivalent to the statement that the complex field amplitude at the sum frequency is proportional to the multiplication of the complex amplitudes at the two low frequency fields.

It should be noted that for a given pump frequency, there may be a broad band of signal-idler frequency pairs that fulfill the phase matching requirement, depending on the specific dispersion characteristics of the non-linear medium and on its thickness. In some configurations, the phase matching bandwidth can reach hundreds of nanometers in the near IR for thick crystals of up to several centimeters.

The approach of the present invention for multiplexing CDMA channels stems from the fact that the coherent phase relation between the signal and the idler fields can be controllably and reversibly destroyed by affecting (manipulating) the phase relation between the frequencies in a controlled reversible way, for example, by use of general pulse shaping techniques, but also by much simpler manners, such as the introduction of relative delay or material dispersion between the signal and the idler fields. The phase relation can be restored just by reverting the operation, for example, by the insertion of an opposite delay or inverse dispersion. By assigning a unique phase-effect value to one of the signal and idler fields of the specific channel, i.e., assigning a unique phase relationship (e.g., relative delay) between the signal and idler fields of the specific channel, the data in this channel can be extracted from other channels arriving at the receiver side.

Figure 3A:
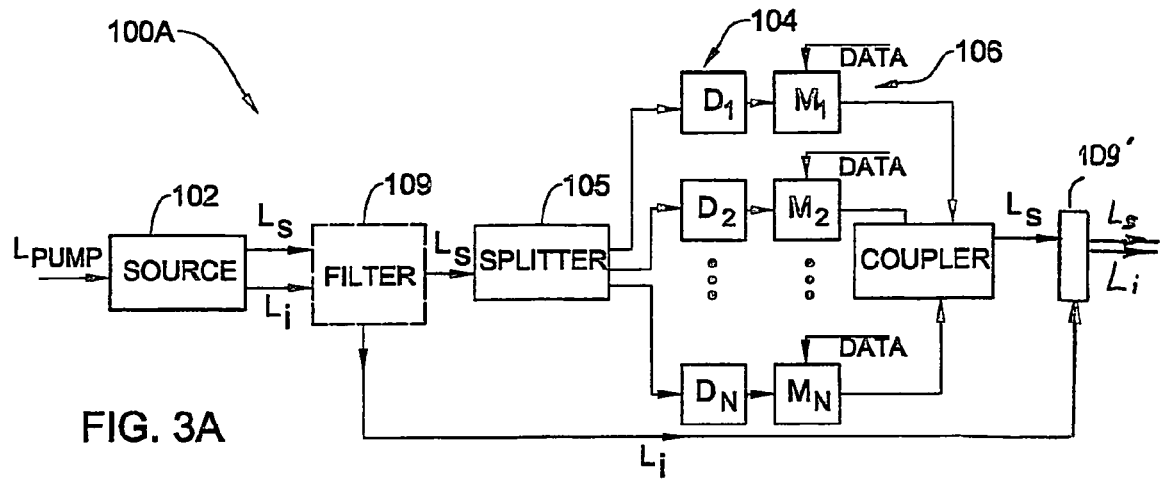
FIGS. 3A and 3B illustrate two examples, respectively, of an optical CDMA transmitter system (multiplexer) according to the invention, where the key is generated at the data transmitting system.

FIG. 3A illustrates one example of an optical CDMA multiplexer system 100A of the present invention. In this example, all channels share the same signal and idler fields (key and conjugate), i.e. the channels use the signal-idler pairs, respectively, emitted by one source. Alternatively, this can be achieved by coupling many sources together via seeding of all sources by one broadband noise field. The system 100A thus comprises an encoder assembly formed by a source arrangement 102 and a phase affecting utility 104 (such as a dispersive glass bulk); a data modulator utility 106 associated with a control unit (not shown); and an output beam coupler 108. It should be noted that the modulator utility 106 can alternatively be accommodated upstream of the phase affecting utility (with respect to the direction of light propagation through the system 100A). The light source arrangement 102 includes a non-linear medium, and may be constituted by a single non-linear crystal, that may and may not be included in a resonator cavity (OPO). Preferably, the source 102 is a novel OPO arrangement developed by the inventors, as described below. The source 102 is associated with a beam splitting assembly 105 accommodated in the optical path of either one of down converted signal and idler fields $L_s$ and $L_i$—in the path of the signal field $L_s$ in the present example. The phase affecting utlity 104 is composed of an array of phase-affecting units $D_1$-$D_N$, each operable to uniquely affect the phase of light passing therethrough, for example by applying relative delay or material dispersion. In the present example, where the idler field components of all the channels propagate all together through the system, the phase affecting utility is associated with the signal field components. The data modulator utility 106 is composed of an array of modulators $M_1$-$M_N$, each for modulating light passing therethrough in accordance with a specific information piece to be carried by the respective channel.

Also provided in the system 100A is a frequency filter 109 accommodated at the output of the source 102 upstream of the beam splitter 105. It should be noted that the provision of the frequency filter 109 is optional and depends on the configuration of the OPO source used. For example, when using a non-collinear OPO configuration, the output signal and idler fields are spatially separated from each other, in which case there is no need for frequency filtering at the output of the OPO source. A similar frequency filter 109' is provided at the output of the system 100A to combine the signal and idler fields prior to being transmitted towards a receiver side.

The system 100A operates in the following manner. The OPO source 102 is pumped by input light $L_{pump}$ and converts this light into a matching pair of output signal and idler fields $L_s$ and $L_{id}$, which are spatially separated (e.g., by the frequency filter 109). The beam splitting assembly 105 (such as a mask or cascaded semi-transparent mirrors) is accommodated in the optical path of the of the signal field $L_s$ and splits it into a plurality of N spatially separated signal components $L^{(1)}_s, L^{(2)}_s, \ldots, L^{(N)}_s$. These signal components $L^{(1)}_s$-$L^{(N)}_s$ then pass through relative delay units $D_1$-$D_N$, respectively, of the phase affecting utility 104, preprogrammed to apply different delay values $\tau_1$-$\tau_N$, respectively, to light passing therethrough. The so-delayed (encoded) signal components $L^{(1)}_s$-$L^{(N)}_s$ pass through modulators $M_1$-$M_N$, respectively, of the data modulator utility 106, where they undergo amplitude modulation in accordance with specific information pieces to be carried by each of the channels. It should be understood that, generally, the phase affecting is applied to either one of the down converted signal and idler fields, and data modulation is applied to either one of these fields or both of them.

Thus, in the multiplexer system 100A, every signal field produced by the source 102 is modulated and encoded with a unique phase effect value, e.g., unique amount of delay between the signal and the idler fields. It should be understood that in the present non-limiting example, the simple case of relative delay is used as the mechanism for controlled reversible phase manipulation. It is obvious that other phase manipulation techniques can be utilized equally well (e.g., dispersion or general pulse shaping).

According to the current scheme, the keys for all the channels are uniquely delayed versions of a single white-noise key. The minimal delay value required in order for these two versions to be un-correlated is of the order of the coherence time of the signal (or the idler) field $\tau=1/\Delta\omega$, wherein $\Delta\omega$ is the spectral width of the down converted light Thus, this is the minimal difference between unique delays associated with different channels. When other phase manipulation techniques are used, a similar criterion can be calculated (e.g., for the minimal difference between dispersion values required).

All N signal components, after being phase affected and data modulated, are joined together by the beam coupler 108, combined with the idler field $L_i$ by the frequency filter 109', and both directed to an optical network to be transmitted to the receiver end. In the transmitted light, the phase relations are destroyed for all the channels, and if one would try to perform frequency up conversion on the spectrum arriving from the network no channel will be detected. This is similar to a situation of synchronization loss in electronic CDMA, where the receiver multiplies by the correct key, but not at the right time.

Figure 3B:
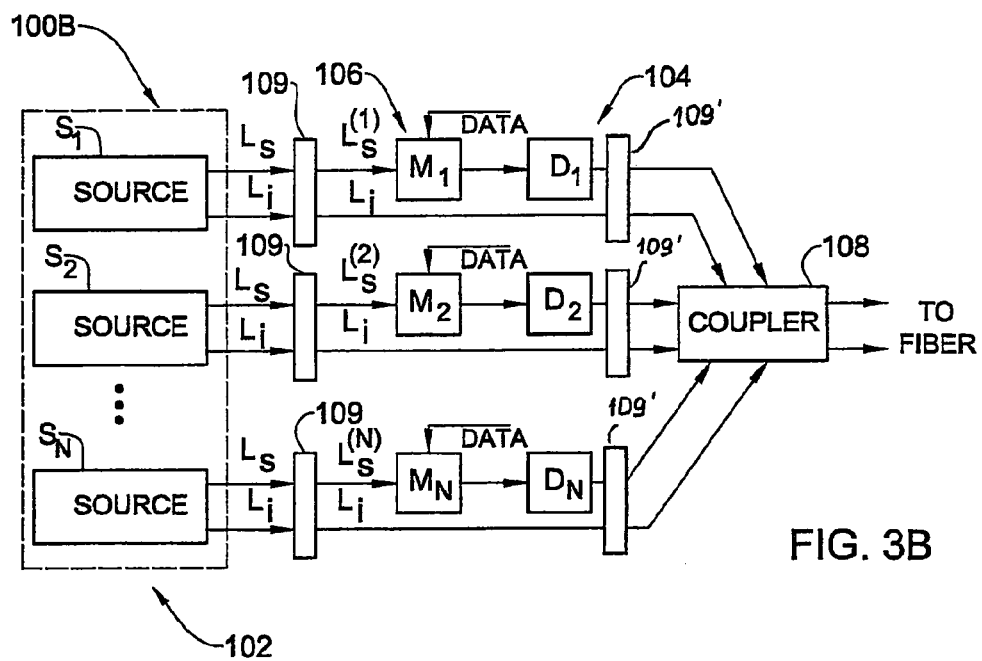

FIG. 3B illustrates an optical CDMA multiplexer system 100B according to another example of the present invention. In this example, in distinction to the example of FIG. 3A, each channel has its own key, i.e., is generated by its own source. To facilitate understanding, the same reference numbers are used for identifying those components that are common in the examples of FIGS. 3A and 3B. In the present example, the modulator utility 106 is located upstream of the delay utility 104, but it should be understood that, in this respect, the construction can be similar to that of FIG. 3A. Thus, the system 100B comprises a light source arrangement 102, including a plurality of N sources of down converted light (preferably, novel broadband OPO arrangements described below) $S_1$-$S_N$; a data modulator utility 106 including N modulators $M_1$-$M_N$ appropriately operated by a control unit; a phase affecting (e.g., delay or material dispersion) utility 104 including N phase affecting units—relative delay units $D_1$-$D_N$ in the present example operating to apply different relative delays $\tau_1$-$\tau_N$, respectively, to light passing therethrough; and a beam coupler 108. Although in the present example the phase affecting utility is shown as being associated with the signal field, it should be understood that, generally, it is associated with at least one of the signal and idler fields. In the system configuration of the present example (where both the signal and idler fields are spatially separated into multiple channel components), the phase affecting utility can be associated with both of the signal and idler fields, provided it creates unique phase relation between the signal and idler field components of each channel. Optionally provided in the system 100B are frequency filters, generally at 109, located at the outputs of the sources $S_1$-$S_N$ and frequency filters 109' each in the optical paths of the corresponding modulated and phase affected signal field and idler field, propagating towards the coupler 108. As indicated above, the need for frequency filters depends on the type of OPO cavity configuration.

The system 100B operates in the following manner. Each of the down converted light sources $S_1$-$S_N$ is pumped to produce a signal-idler fields' pair. The signal components $L_s^{(1)}$-$L_s^{(N)}$ are spatially separated from the idler components $L_i^{(1)}$-$L_i^{(N)}$. The signal components $L_s^{(1)}$-$L_s^{(N)}$ (or idler components, or signal and idler pairs) pass through the modulators $M_1$-$M_N$, and are thus amplitude modulated in accordance with respective data portions. The modulated signal components $L^{(1)}_s$-$L^{(N)}_s$ then pass through the relative delay units $D_1$-$D_N$, respectively. Alternatively, the signal components (either modulated or not) may undergo phase effects by passing through units $D_1$-$D_N$.

Then, the modulated phase-affected signal components $L_s^{(1)}$-$L_s^{(N)}$ and the unaffected idler components are combined together by the beam coupler 108 and directed to an optical network to be transmitted to receiver stations. It should be noted that, generally, the signal and idler fields of each pair may not be separated for the purposes of data modulation, and may both be modulated. Accordingly, in this specific example, where the encoding (phase affecting) is applied to the signal (or idler) components after the data modulation, the frequency separation may be applied to the modulated light propagating towards the phase-affecting utility 104.

Figure 3C:
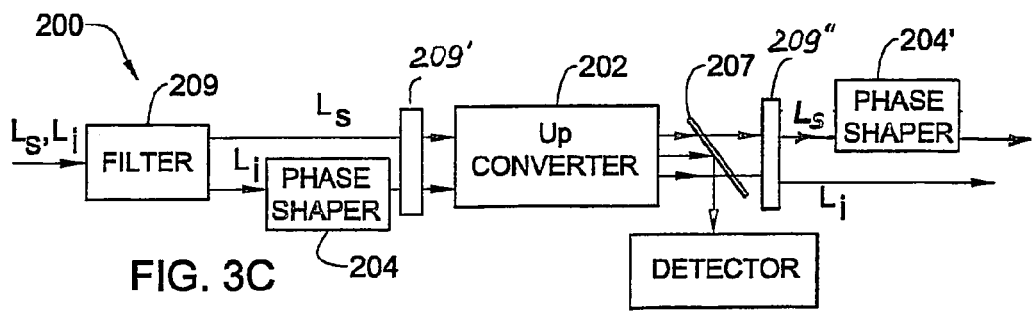
FIG. 3C illustrates an optical CDMA channel receiver system (demultiplexer) according to the invention.

FIG. 3C schematically illustrates an optical CDMA channel receiver system 200 according to the invention, where decoding of the received light is carried out to extract one specific optical channel from all other channels arriving at this station, while allowing all the other channels to continue propagation towards a next station in the network. A complete demultiplexer will be composed accordingly of many such receiver systems in cascade.

The system 200 comprises an input frequency filter 209; an input phase affecting (e.g., relative delay) utility 204; an up converter (non-linear medium) 202; a frequency filter 207; and optionally, frequency filters 209' and 209", and a phase affecting (relative delay) utility 204'. The only data needed for decoding the specific channel includes the pump frequency and the phase effect (delay) value that has been used for encoding this specific channel. These two conditions can be once preset by a communication protocol and then used with no dependence on the key noise associated with the channel.

The broadband idler portion $L_i$ (containing light components $L^{(1)}_i$-$L^{(N)}_i$) and the broadband signal portion $L_s$ (containing light components $L^{(1)}_s$-$L^{(N)}_s$), arriving from the optical network, pass through the system 200. The input filter 209 (such as grating assisted coupler or dichroic beam splitter/combiner) thus receives incoming light and spatially separates between the signal and idler portions $L_s$ and $L_i$. The input phase affecting utility 204 is accommodated at that output of the filter 209 which is associated with the optical path of the idler portion $L_i$. The up converter 202 is accommodated in both outputs of the filter 209 downstream of the utility 204, and is thus in the optical paths of the signal light portion and the phase-affected (delayed) idler portion.

Generally, the phase effect at the input of the decoder system is aimed at restoring the phase relation of the down converted signal and idler fields, that has been destroyed at the encoder system. Hence, considering delay as a phase effect, the phase affecting utility 204 is accommodated so as to manipulate the phase of the down converted field that has not been phase affected at the encoder system. The relative delay utility 204 is preprogrammed to apply to light passing therethrough a unique delay value, which is the inverse delay of that applied while encoding this specific channel in the transmitting system. Thus, only one frequency component, e.g., $L_i^{(1)}$, in the delayed (phase-affected) idler has its delay-matching is signal component, $L_s^{(1)}$, in the signal, and accordingly, the phase relation of only one channel is restored in the parametric up conversion at the original pump frequency, since only this pair of field components $L_s^{(1)}$-$L_i^{(1)}$ meets the requirements of efficient up conversion. The frequency filter 207 (e.g., dichroic mirror) now separates the up converted light out of the entire output of the up converter 202 and directs it to a detector.

When the up conversion intensity at the pump frequency is detected, this channel will be prominent above the noise (generated by other channels). Since each receiver system detects only one channel and all other channels just pass through without disturbance, it is reasonable (but not necessarily) that after enabling the detection of the specific (filtered) channel, the receiver system will reinsert the phase effect (delay) in order to leave the situation unchanged for all other channels. The remaining output of the up converter 202 thus passes through the frequency filter 209" that separates between the signal and idler portions. The remaining signal portion passes through the output delay utility 204' where it undergoes a relative delay equal to that previously applied to the idler portion by the delay utility 204, and the signal and idler portions propagate towards a next station in the network.

It should be understood that the provision of filter 209" and output phase affecting utility 204' is optional, and can be eliminated by specifically designing a communication protocol between encoder and decoders. For example, the protocol sets an order of the arrayed decoders, and thus each decoder, while applying a phase effect to incoming light, takes into account the entire phase effect the light has undergone at the preceding decoders.

Comparing the transmitting system configurations of FIGS. 3A and 3B, it should be understood that the configuration of FIG. 3B would suffer from a higher noise level at the receiver side, due to the existence of multiple keys (idlers) in addition to multiple channels (phase-coded signals), and therefore can support a lower number of channels ($\sqrt{N}$) compared to the number of channels (N) supported by the configuration of FIG. 3A. However, the scheme of FIG. 3B is simpler in the following: every channel is self-contained and independent of mutual resources, and modulation can be performed via direct modulation of the narrowband pump instead of the broadband signal. Therefore, the multiple sources configuration may be considered when the number of channels is relatively low compared to the capacity of the system.

Thus, according to the present invention, once broadband down conversion is achieved, the signal field is separated from the idler field by means of a spectral filter. The signal field is identified as the key and the idler field as the conjugate key. The key is inherently unknown. The conjugate key must somehow reach the data receiving side together with the data-carrying key in order to enable the extraction of the transmitted data.

The above examples of FIGS. 2A-2B and 3A-3C present one possible, probably most intuitive, configuration, where the transmitting side ("the talker") generates the key and the conjugate key, modulates one of them with data, and sends both of them to receiving side ("the listener"). The listener performs up-conversion and extracts the data.

Figure 3D:
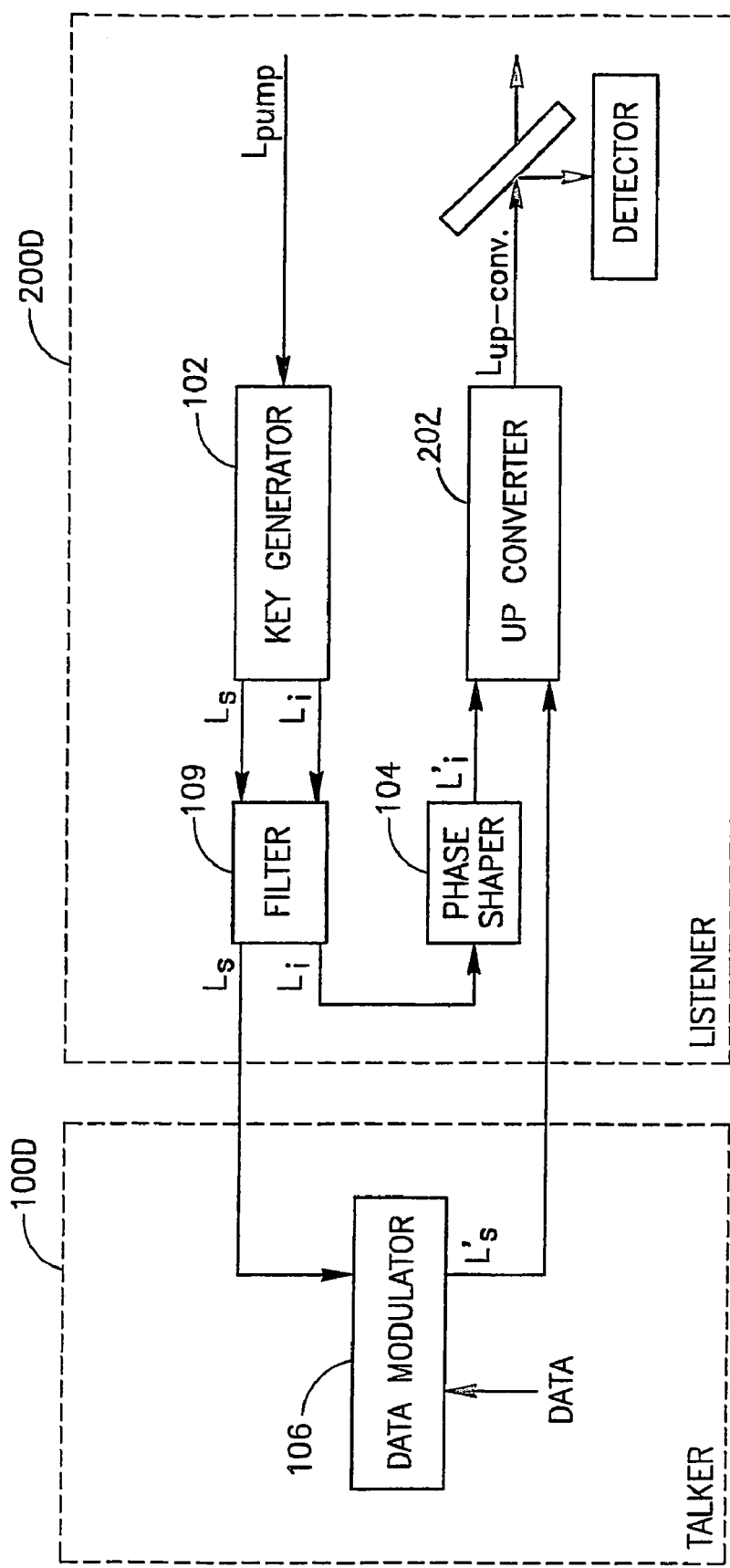
FIG. 3D illustrates the main principles underlying the optical CDMA key generation scheme according to another example of the present invention, where the key is generated at the data receiving system

FIG. 3D exemplifies another configuration, which is a bit similar to public key encryption. A transmitting system 100D (the talker) and a receiving system 200D) (the listener) are schematically illustrated. In this example, the key and the conjugate key are generated at the listener system 200D, and only one of these keys (signal) is sent to the talker system 100D. The listener system 200D includes a key generator (source) 102, a filter 109, a phase shaper (e.g., delay utility) 104, an up converted 202, another frequency filter 207, and a detector 212. The talker system 100D includes a data modulator utility 106 associated with a data generating unit (not shown).

At the listener system 200D, the source 102 generates signal and idler light fields $L_s$ and $L_i$ (key and its conjugate), which are spatially separated by the filter 109, and one of them (e.g., signal component $L_s$) is transmitted to the talker system 200D, while the other $L_i$ is kept at the listener system to pass through the phase shaper 104 and thus obtain an appropriately delayed idler field $L'_i$ in order to enable extraction of data via up conversion. A distance between the data receiving and data transmitting systems can serve as a unique delay signature. The talker system 100D receives the key $L_s$, modulates it (probably together with other noises that arrive with the data), and sends the data-modulated signal $L'_s$ back to the listener system 200D, where this modulated signal $L'_s$ together with the other delayed key (idler) $L'_i$ undergo up-conversion and a resulting signal is detected.

It should be noted that the present invention allows for using any type of modulation for data transmission, namely, not only amplitude modulation, but also frequency or phase modulation. In this connection, it should be understood that although minute frequency/phase shifts cannot be detected directly from the broadband incoherent key (signal), still, since the up conversion appears at the sum frequency with a phase that is a sum of the signal and idler phases, a small frequency/phase shift of the signal will cause the same frequency/phase shift of the narrowband coherent up converted field, which is easily detected.

Figure 3E:
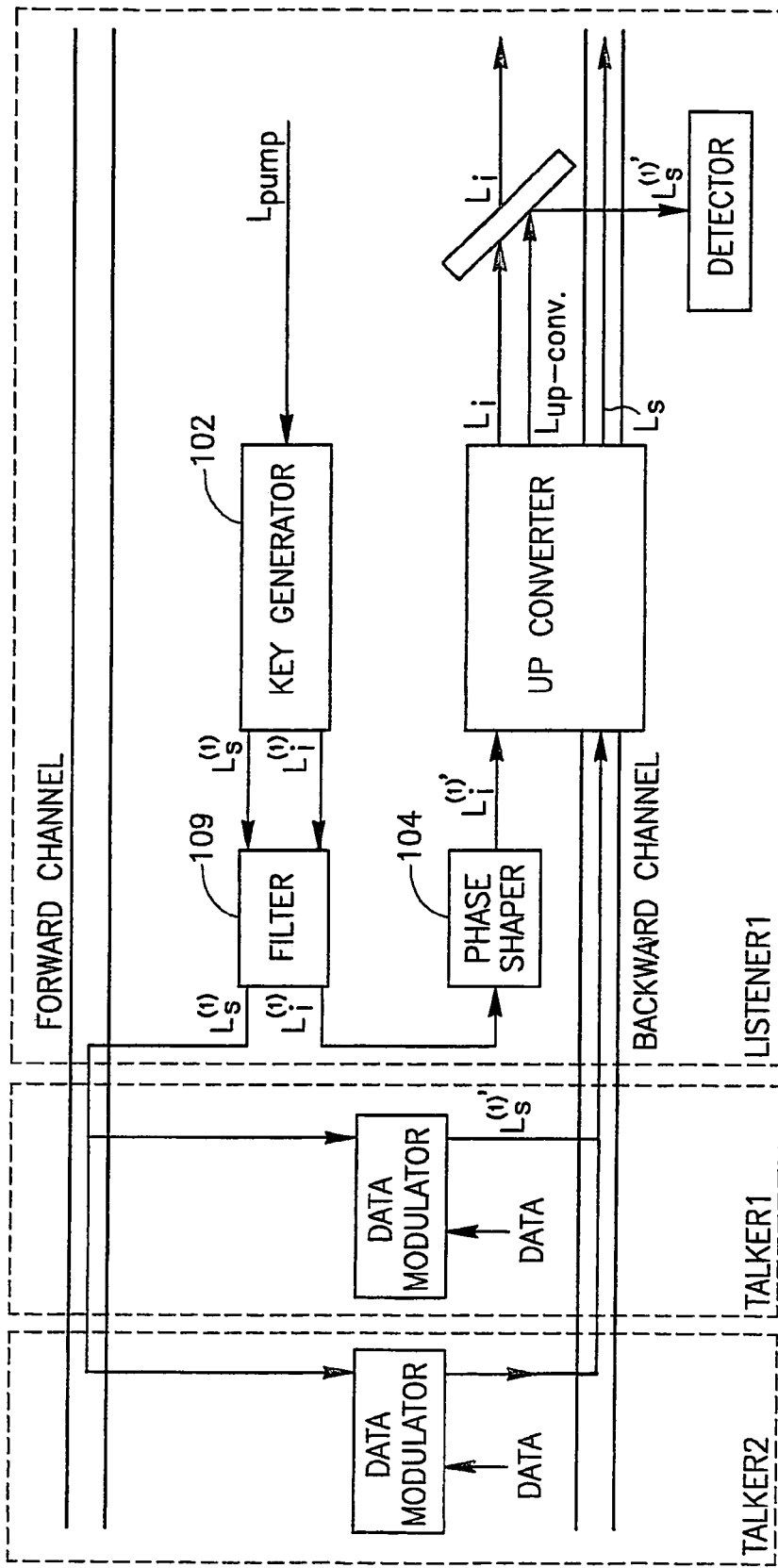
FIG. 3E illustrates optical CDMA transmitter and receiver systems utilizing the principles of the example of FIG. 3D.

FIG. 3E illustrates in a self-explanatory manner an example of an optical CDMA multiplexer/demultiplexer system utilizing the principles of the technique of FIG. 3D, where the key generation is carried out by the "listener". In the present example, the network contains a forward channel for all the "public keys" (signals $L^{(1)}_s$ and $L^{(2)}_s$ addressed to, respectively, Talker 1 and Talker 2), and a backward channel for returning data (data modulated signals $L^{(1)'}_s$ and $L^{(2)'}_s$). A user (listener), who wishes to receive data, generates his own keys $L^{(1)}{}_s$ and $L^{(1)}{}_i$ and sends his "public key", $L^{(1)}{}_s$, into the forward channel of the network. The other user (Talker 1), who wishes to communicate with that listener, splits a part from the forward channel to receive signal $L^{(1)}{}_s$, modulates it with data, and inputs the data modulated signal $L^{(1)'}{}_s$ into the backward channel. The talker may also add a spectral phase signature to identify this specific talker-listener connection. This is optionally, since the distance to that specific talker already serves as a unique delay signature. The listener will extract the data via up-conversion using his conjugate "private key", $L^{(1)}{}_i$, after appropriate delay and insertion of the opposite spectral phase.

In the optical CDMA scheme, the number of simultaneous channels, each of bandwidth δ that can be accommodated within a total bandwidth Δ is given by $$N = \frac{1}{2}\frac{1}{s/n}\left(\frac{\Delta}{\sigma}\right) \quad (1)$$

where s/n is the minimum allowed signal to noise ratio, and the major noise source is assumed to be interference caused by other channels. This result is just a factor of 2 less than expected in an ideal asynchronous CDMA system, which is due to the fact that according to the CDMA scheme of the present invention the key has to be transmitted also. Hence, in this scheme the spectral efficiency can reach 0.5/(s/n). It is important to note that since the key is ideal (true white noise), this result is independent of practical constraints, such as lower/upper bounds on the single channel bit rate.

Figure 3F:
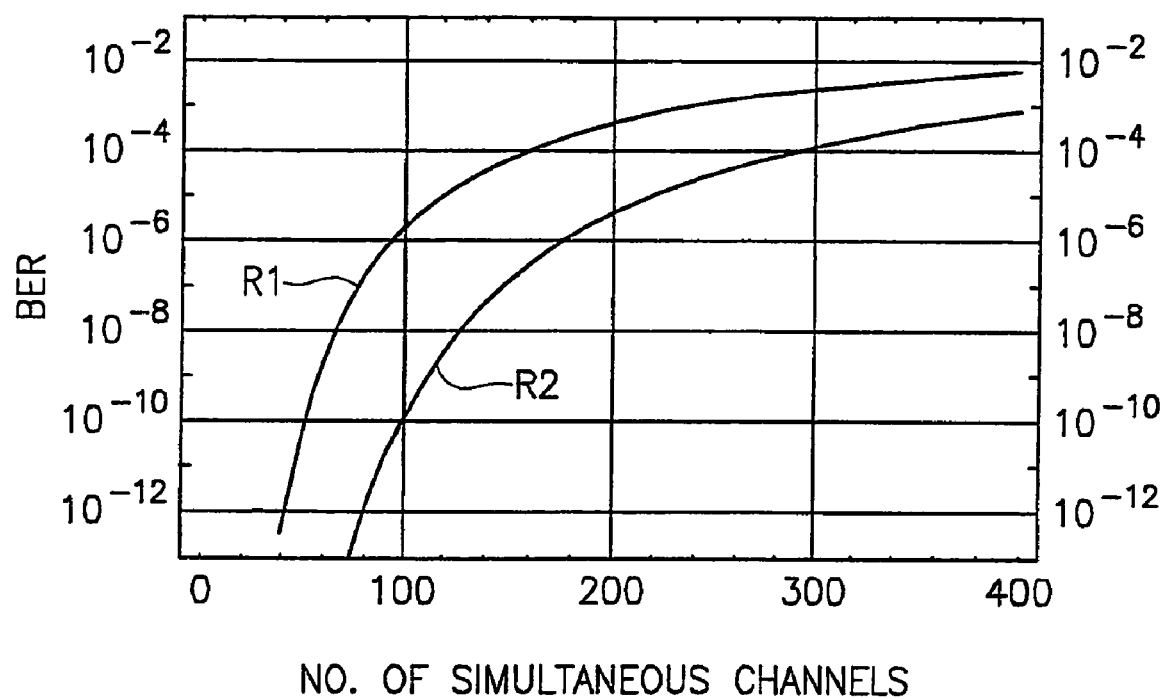
FIG. 3F graphically illustrates calculated bit error rate (BER) as a function of the number of simultaneously transmitting CDMA channels for ON-OFF keying modulation (OOK) with incoherent detection and phase-shift keying (PSK) with coherent detection.

Equation (1) reflects the relation of the noise level at the receiver of a single channel to the total number of simultaneous channels. Referring to FIG. 3F, graphs $R_1$ and $R_2$ translate this relation into bit error rate (BER) for, respectively, ON-OFF keying modulation (OOK) with incoherent detection and phase-shift keying (PSK) with coherent detection. As evident from this figure, coherent PSK yields much better BER results compared to incoherent OOK. This is because coherent modulation is known to be preferable in many aspects (BER, power management, reduced non-linearities, etc.). Albeit, coherent modulation is considered impractical in the optical domain because it requires a local oscillator at the receiver that is phase locked to the transmitting laser. With the CDMA approach of the present invention, a reference local oscillator can be easily sent from the transmitter to the receiver. Since all channels share the same down converted field and the same pump, the pump serves as a local oscillator for all the channels. The pump cannot be sent along with the data as is (mostly because of non-linearities), but if one channel is "sacrificed" and not modulated with data, the up conversion field of that channel will be just a replica of the CW pump field, which can be used as a phase reference for all other channels. Thus, coherent detection can be performed at the price of one less data channel. Coherent modulation is made possible here due to is the fact that all the channels are optically equal in the sense that all share the same pump (or up-conversion) and down converted fields. This fact can be used for performing other kinds of optical manipulations. For example, an optical switching scheme can be configured, where after demultiplexing (up-conversion with the appropriate delay for each channel) it is possible to re-multiplex the channels in a different order by down converting them again and rearranging their delays.

In the optical CDMA scheme according to the invention, all channels are optically equal in the sense that all have the same pump (or up conversion) wavelength and the same down converted spectrum, so performing optical manipulations on the channels becomes easier. This feature can advantageously be used, for example, in an optical switching scheme, where after demultiplexing (up conversion with the appropriate phase effect for each channel), it is possible to re-multiplex the channels in a different order by down converting them again and rearranging their phase relations. Additionally, the optical CDMA scheme of the present invention is essentially immune to non-linear effects in fibers, such as Brillouin scattering, self phase modulation, cross phase modulation and four wave mixing. Non-linear effects occur when the intensity in the fiber is high, and are thus generally minimized by broadband noise-like fields (as is the case for the signal and the idler), because a noise-like field minimizes the possibility for persisting constructive interferences.

In order to understand the signal-idler correlation in parametric down conversion, the inventors utilized the theoretical treatment given in [2], Ch. 6, pp. 67-85. The standard equations of three waves mixing describing the down conversion process, under the simplifying assumptions of a lossless medium and perfect phase matching, are:

$$\frac{\partial A_s}{\partial z} = -i\kappa A_i^* A_p \quad (2)$$

$$\frac{\partial A_i}{\partial z} = -i\kappa A_s^* A_p,$$

$$\frac{\partial A_p}{\partial z} = -i\kappa A_s A_i$$

where $A_s$, $A_i$ and $A_p$ are the slow varying amplitudes of the signal, idler and pump, respectively, and k is the non linear coupling, which is related to the non-linear coefficient d (MKS) as follows:

$$\kappa = \frac{d}{2}\sqrt{\frac{\mu_0}{\varepsilon_0}\frac{\omega_s\omega_i\omega_p}{n_s n_i n_p}} \quad (3)$$

where $n_x$ is the refractive index of field x (x=s, i, p).

For the purposes of the present invention, the phase correlations between the three amplitudes are of interest, so a transformation to polar coordinates can be used:

$$\frac{\partial R_s}{\partial z} + iR_i\frac{\partial \theta_s}{\partial z} = -ikR_iR_p\exp[i(\theta_p - \theta_s - \theta_i)] \quad (4)$$

$$\frac{\partial R_i}{\partial z} + iR_i\frac{\partial \theta_i}{\partial z} = -ikR_sR_p\exp[i(\theta_p - \theta_s - \theta_i)]$$

$$\frac{\partial R_p}{\partial z} + iR_i\frac{\partial \theta_p}{\partial z} = -ikR_iR_s\exp[i(\theta_p - \theta_s - \theta_i)]$$

where the expression $A_x=R_x\exp(i\theta_x)$ has been substituted for all three waves (x=s, i, p).

Now, the expression $\Delta\theta=\theta_p-\theta_s-\theta_i$ is substituted into equations (4), and the real and imaginary parts are separated:

$$\frac{\partial R_s}{\partial z} = kR_iR_p\sin\Delta\theta \quad (5)$$

-continued $$\frac{\partial R_i}{\partial z} = kR_s R_p \sin\Delta\theta$$

$$\frac{\partial R_p}{\partial z} = -kR_s R_i \sin\Delta\theta$$

$$\frac{\partial \Delta\theta}{\partial z} = k\cos\Delta\theta \left[ \frac{R_i R_p}{R_s} + \frac{R_s R_p}{R_i} - \frac{R_i R_s}{R_p} \right]$$

Substituting the three upper equations (5) into the fourth one, and performing some simple algebraic manipulations, yields:

$$\frac{1}{\cos\Delta\theta}\sin\Delta\theta\frac{\partial \Delta\theta}{\partial z} = \frac{1}{R_s}\frac{\partial R_s}{\partial z} + \frac{1}{R_i}\frac{\partial R_i}{\partial z} + \frac{1}{R_p}\frac{\partial R_p}{\partial z} \quad (6)$$

Equation (6) is equivalent to the following:

$$-\frac{\partial}{\partial z}[\ln(\cos\Delta\theta)] = \frac{\partial}{\partial z}[\ln(R_s R_i R_p)] \quad (7)$$

the solution of which provides $$\cos\Delta\theta = \frac{C_1}{R_s R_i R_p} \quad (8)$$

where $C_1$ is an integration constant. Since the phase difference $\Delta\theta$ is real, it is clear that the constant $C_1$ is bound by the initial values of the field amplitudes $R_x[0]$, according to the following:

$$0 \le |C_1| \le R_s[0]R_i[0]R_p[0] \quad (9)$$

In most practical cases, at least one of the fields $A_s$, $A_i$ and $A_p$ is initiated by spontaneous emission noise, so it is practically zero. Thus, as the field amplitudes grow, the denominator of equation (8) becomes much larger than the nominator, so the value of the constant $C_1$ becomes irrelevant, and, for all practical purposes, we obtain $\cos\Delta\theta=0$. Hence, the phases of the signal and the idler are correlated according to the following:

$$\theta_s + \theta_i = \theta_p - \frac{\pi}{2} \quad (10)$$

If the pump phase is selected to be $\theta_p=\pi/2$, we have:

$$\theta_s = -\theta_i \quad (11)$$

Consequently, the phase of an idler mode in an OPO cavity is inverse to that of the corresponding signal mode. The absolute value correlation between the signal and the idler fields can be understood from the fact that they are symmetric in equations (4). Thus, if the initial conditions are symmetric, then this symmetry will be preserved, so the complex amplitudes of a signal mode and the corresponding idler mode are conjugates of each other.

Usually, both the signal and the idler are broadband and contain many frequencies. The reason is that phase matching, which is the limiting parameter to the maximal possible spectral width is seldom narrower than 1 nm and may in some cases extend over hundreds of nanometers. Thus, the signal and the idler fields usually contain many modes with no phase correlation among them, so their phases are random. This gives rise to continuous wave (CW) signal and idler fields, each is with no spectral coherence among its modes.

Considering the general process of sum frequency generation (parametric up conversion), the intensity $R(\omega)$ of up converted light at frequency $\omega$ is given by:

$$R(\omega) \propto |\int d\omega' A(\omega')A(\omega-\omega')|^2 \quad (12)$$

where $A(\omega)$ is the slow varying amplitude of the field at frequency $\omega$.

Here, all the pairs of amplitudes that sum up to the frequency $\omega$ are added coherently. Generally, a spectraliy incoherent broadband source will yield poor conversion efficiency, because the phases of the participating frequencies are uncorrelated (random), so the contributions of all the low frequency pairs, that sum up to a specific up conversion frequency, interfere almost totally destructively.

However, when down converted light is used as input for the up conversion process, due to the phase relation between the signal and the idler fields, all the frequency pairs that sum up to the original pump frequency have the same phase, so all these pairs interfere constructively yielding an up converted intensity that is enhanced by several orders of magnitude compared to what is expected when no phase correlation exists. The enhancement depends on the actual spectral width of the signal and the idler. This enhancement can occur only when the signal field meets its "twin" idler field, so it extracts the data out of the noise only if the key matches (i.e., acts exactly as expected from the multiplication by the conjugate key in CDMA).

Thus, considering up conversion applied to light generated by parametric down conversion, assuming that the spectral phases of the entire spectrum have been modulated by some general phase function $\phi(\omega)$, we have:

$$A(\omega)=\exp[i\phi(\omega)](A_s(\omega)+A_i(\omega))=\exp[i\phi(\omega)](A_s(\omega_p-\omega)) \quad (13)$$

where $A_s(\omega)$ has a random phase and the fact that the signal and idler are complex conjugates is taken into account. Inserting equation (13) into equation (12) yields:

$$R(\omega) \propto \left| \int d\omega' \begin{bmatrix} A_s(\omega')A_s(\omega-\omega') + \\ A_s^*(\omega_p-\omega')A_s^*(\omega_p-\omega+\omega') + \\ A_s(\omega')A_s^*(\omega_p-\omega+\omega') + \\ A_s^*(\omega_p-\omega')A_s(\omega-\omega') \end{bmatrix} \exp[i\phi(\omega')+i\phi(\omega-\omega')] \right|^2 \quad (14)$$

Equation (14) contains four terms in the integrand. Since the phase of $A_s(\omega)$ is assumed to be random, integration of the first two terms will result in a negligible contribution to $R(\omega)$, because of destructive interferences. The contribution of the last two terms can be very substantial when $\omega=\omega_p$. Then, we obtain:

$$R(\omega_p) \propto \left| \int d\omega' |A_s(\omega')|^2 \exp[i\phi(\omega')+i\phi(\omega_p-\omega')] \right|^2 \quad (15)$$

It is clear that the resulting up conversion intensity will depend critically on the characteristics of the phase function:

it will be drastically reduced by phase functions that are symmetric around $\omega_p/2$, while it is insensitive to anti-symmetric phase functions.

If there is a relative delay between the signal and idler fields a value above a certain threshold value, no up conversion of this signal-idler pair will occur. For a simple case of a relative delay $\tau$ between the signal and the idler fields, which is equivalent to a linear phase function on half of the spectrum, we have:

$$R(\omega_p) \propto \left| \int_0^{\omega_p/2} d\omega' |A_s(\omega')|^2 \exp[i\omega'\tau] \right|^2 \quad (16)$$

This result is equal to that obtained when up converting the sum of two equal transform limited pulses of the same spectral width and relative delay of $\tau$. When the relative delay exceeds the pulses temporal width (which is inversely proportional to the pulse spectral width), no up conversion will occur. Thus, the constructive interference can be destroyed, by applying a delay of the order of the coherence time of the signal field $\tau=1/\Delta\omega$ ($\Delta\omega$ being the spectral width of the down converted light).

As described above, the temporal resolution obtained by a parametric source is equal to that obtained by a transform limited pulse. Consequently, an OPO/OPA oscillating over the widest possible spectrum is desired in order to fully exploit this feature. A necessary condition for a broadband oscillation is phase matching over a broad wavelength range.

Figure 4A:
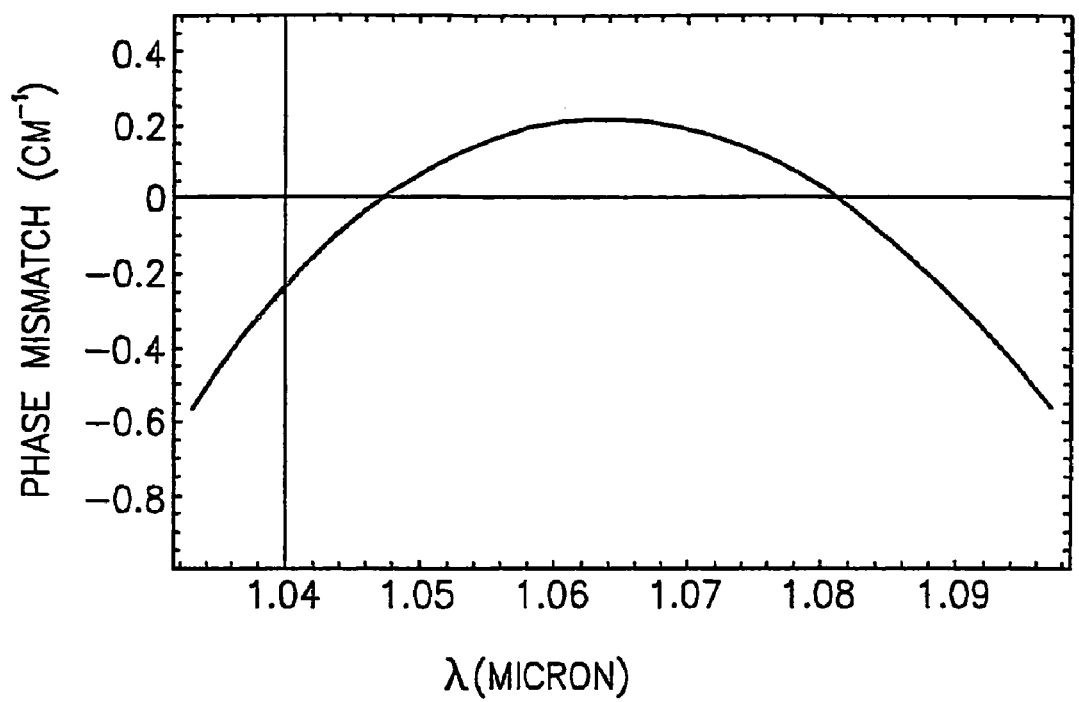
FIG. 4A illustrates the signal/idler phase mismatch as a function of wavelength near the degeneracy point for a periodically polled KTP crystal pumped at 532 nm.

It is generally known that when the signal and the idler are close to degeneracy (i.e. $\omega_i \approx \omega_s \approx \omega_p/2$), the type I phase matching (where the signal and the idler have the same polarization) becomes broad. This is illustrated in the graph of FIG. 4A, which shows the phase mismatch ($\Delta k \equiv k_p - k_s - k_i$) as a function of wavelength near the degeneracy point for a periodically polled KTP crystal pumped at 532 nm. As evident, to first order in wavelength, the phase matching condition for wavelengths close to that point is the same. A spectral width of tens of nanometers around 1064 nm for a crystal length of 1 cm can thus be expected.

Figure 4B:
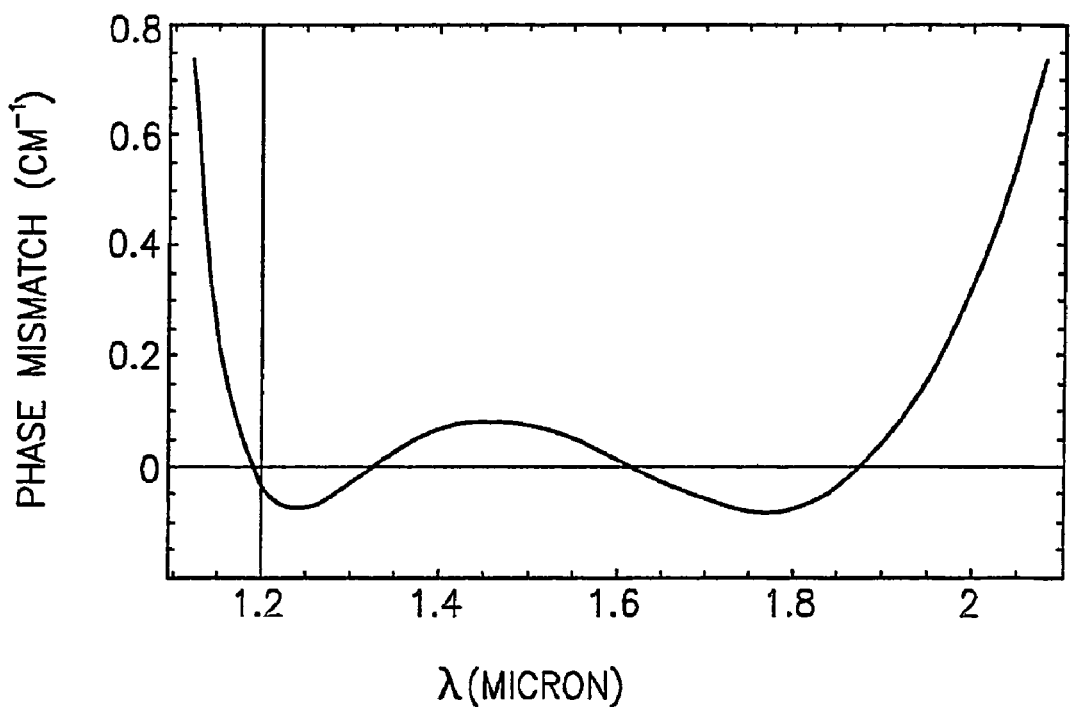
FIG. 4B illustrates the signal/idler phase mismatch as a function of wavelength around the degeneracy point, for the zero dispersion ultra broadband case, for a BBO crystal pumped at 728 nm.

Much broader phase matching is possible if the pump is tuned so that the degeneracy point (at the wavelength of $\lambda=2\lambda_p=4\pi c/\omega_p$) coincides with the point of zero dispersion of the crystal. At the zero dispersion point, the second derivative of the index of refraction with respect to the wavelength vanishes, so the index of refraction is predominantly linear in wavelength. When the index of refraction is linear, any two complementary wavelengths are phase matched. Higher orders of dispersion will limit the phase matching bandwidth, but only to the fourth order in wavelength, since odd orders of dispersion do not affect phase matching. Thus, with zero dispersion, ultra broad phase matching can be obtained, of up to hundreds of nanometers. This is illustrated in FIG. 4B showing phase mismatch as a function of wavelength around the degeneracy point, for the zero dispersion ultra broadband case, for a BBO crystal pumped at 728 nm.

The OPO may be configured and operated such that the signal and idler fields are either co-linear (in which case, the broad phase matching occurs around the degeneracy point), or non co-linear, in which case an additional degree of freedom, such as an angle between the pump beam and the signal beam can be used to provide the broad phase matching at a convenient pump wavelength.

For the purposes of the present invention, namely designing the complete optical CDMA scheme, a signal/idler generating source is to be of the kind emitting broadband spectrally correlated light. Here, the term "spectrally correlated" signifies sources that have no first order coherence (i.e., the phase of each frequency is unknown, yielding light that essentially resembles white noise), but still possess phase correlations between pairs of frequencies. Phase correlations between frequencies occur in many processes in which more than one photon is emitted, such as second or higher order non-linear interactions and two photon emission. Sources based on second order non-linearities ($\chi_2$ effects), also known as three waves mixing or parametric down conversion, as well as sources based on other known mechanisms, can be used for generating the two broadband conjugate fields. The manipulation of the peculiar coherence properties of such light sources enables their employment in the optical CDMA.

The above processes can be described by the Feynman diagrams shown in FIG. 5A (three wave mixing) and FIG. 5B (four wave mixing). The three wave mixing process can be interpreted quantum mechanically as the conversion of one high energy pump photon into two low energy signal and idler photons. Since there are many possible signal-idler pairs, their energy is undefined. The four waves mixing can be interpreted as the conversion of two pump photons into two broadband signal and idler photons. Generally, any process in which n pump photons are converted into two photons can be considered as the basis for the optical CDMA scheme according to the invention.

When considering a source for broadband down converted light, high conversion efficiency and low threshold are important factors. As indicated above, since the efficiency of down conversion in one pass through a non-linear medium is generally very low, it is preferable to perform this process inside a resonant cavity (OPO). This cavity can be either singly or doubly resonant (resonates only one or both of the down converted fields). Yet, when a resonant cavity is used, mode competition will narrow the bandwidth dramatically, so a special design of the cavity is necessary in order to suppress mode competition. When coming to attack this problem, one should bear in mind that the winning mode of oscillation in a cavity is not necessarily the one with the highest gain, but the one with the highest gain—loss difference. Thus, if the cavity includes a loss mechanism that affects narrowband oscillations but does not harm broadband oscillations, the latter will become the winning mode.

The present invention provides for suppressing mode competition in the OPO cavity by introducing an up conversion loss into the OPO cavity. Since up conversion can be reduced dramatically by dispersion or relative delay, provided the oscillation is broadband, the introduction of the up conversion loss serves as the selective loss mechanism that suppresses mode competition. The up converted spectrum can be controlled by shaping the spectral phases of the down converted light by simple means, such as delay and dispersion, or by more complex means, such as spatial light modulation or those used in shaping ultrashort pulses [23].

Several OPO configurations can be considered for this purpose as illustrated in FIGS. 6A-6B, 7A-7C and 8. The configuration may be collinear/non-collinear, doubly/singly resonant, including one/two non linear media, configured as a linear/ring cavity. The simplest configuration is that of a linear doubly resonant cavity configuration with one non-linear medium shown in FIG. 6A. The inventors have analyzed the performance of this configuration in detail. Analysis of other configurations can be performed similarly.

Gain in an OPO exists only when the down converted light propagates forward through the medium (in the direction of the pump). During backward propagation, only the generation of a backward propagating up conversion can occur. This up conversion is usually a major loss mechanism that limits the performance of an OPO. For example, due to this loss, the conversion efficiency of a linear doubly resonant OPO cannot exceed 50%.

Figure 6A:
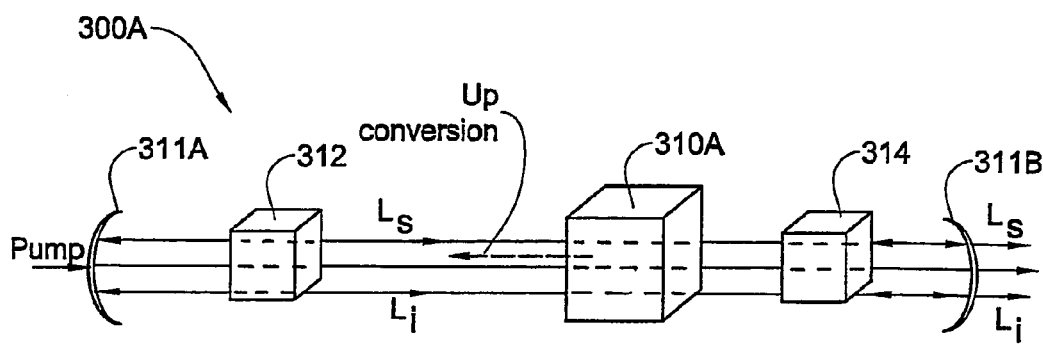
FIGS. 6A and 6B schematically illustrate two examples of a linear cavity doubly resonant OPO source with collinear phase matching, that are suitable to be used in an optical CDMA scheme according to the present invention.
Figure 6B:
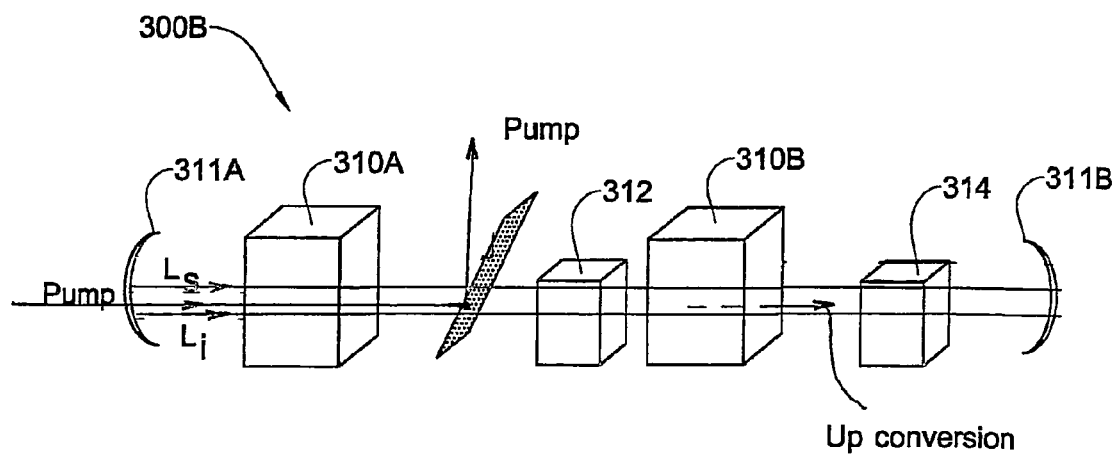

FIGS. 6A and 6B schematically illustrate two examples of the OPO source configuration according to the present invention, suitable for use in a CDMA transmitter system for carrying out the down conversion process. The OPO source 300A of FIG. 6A comprises a non-linear optical medium (crystal) 310A inserted into an optical cavity composed of two mirrors 311A and 311B; and a phase shaper arrangement formed by two phase shaping units (e.g., delay/dispersions units) 312 and 314 at opposite sides of the medium 310—the inverse relative delay/dispersion unit 312 accommodated upstream of the medium 310A with respect to the direction of propagation of a pump light signal $L_{pump}$ through the cavity 300A, and the variable relative delay/dispersion unit 314 accommodated downstream of the medium 310A. Here, the up conversion loss is avoided for broadband oscillations by passing signal and idler light components $L_s$ and $L_i$, resulted from the conversion of pump light $L_{pump}$ by the medium 310A, through the variable relative delay/dispersion unit 314 that introduces a small relative delay/dispersion between the signal and idler components. In order to prevent effect of this relative delay/dispersion onto the down conversion process during forward propagation, the phase relations is restored on the other side of the medium 310A by providing the inverse delay/dispersion unit 312. Since the delay required is inversely proportional to the oscillation bandwidth, it is possible to optimize the introduced delay to reduce the up conversion loss only for broad oscillations, while narrowband oscillations will still suffer from up conversion loss. Thus, in such a cavity, a broadband oscillation can become the winning mode.

In the source configuration 300B of FIG. 6B, in distinction to that of FIG. 6A, a non-linear medium is constituted by two identical non-linear crystals 310A and 310B, the crystal 310A being a pumped crystal and serving as a main oscillator, and the other crystal 310B being an unpumped crystal and serving for suppressing mode competition. After a pump beam $L_{pump}$ traverses the main oscillator crystal 310A, the beam is removed from the cavity (by reflection from an additional mirror), and then a phase shaping is applied to down converted signal and idler fields $L_s$ and $L_i$ by passing them through a phase shaper unit 311A that introduces some relative delay (or dispersion) between the signal and the idler fields. The signal and idler then enter the second crystal 310B, in which up conversion back to the pump may occur. This up conversion will introduce loss to the oscillating signal and idler. As previously mentioned, up conversion of broadband oscillation is very sensitive to relative delay between the signal and the idler. Thus, if this delay is correctly controlled, broadband oscillations will hardly be affected by the second crystal 310B, while narrow oscillations will be diminished by up conversion. To enable the down conversion process during forward propagation, the phase relation is restored by the inverse delay/dispersion unit 311B that introduce an inverse relative delay/dispersion.

In the above examples, co-linear, doubly resonant configurations are used. It should, however, be understood that the principles of the present invention, consisting of suppressing mode competition in an OPO cavity by introducing an up conversion loss into the cavity, can easily be implemented with a non-collinear and/or single-resonant OPO cavity configuration.

Figure 7A:
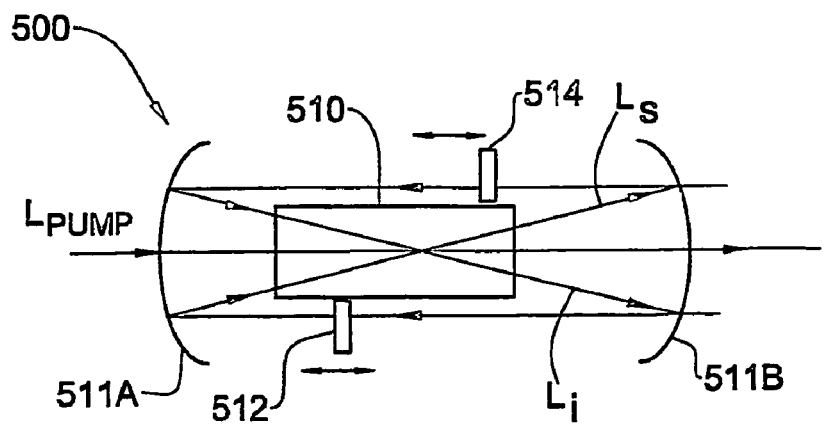
FIGS. 7A schematically illustrate an example of a linear cavity doubly resonant OPO source with non-collinear phase matching.
Figure 7B:
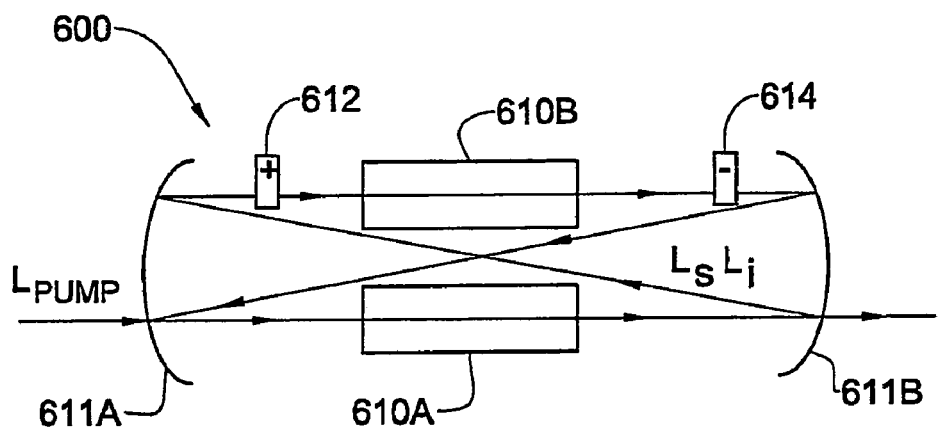
FIGS. 7B and 7C illustrates examples of ring cavity doubly resonant OPO sources with collinear phase matching.

FIGS. 7A and 7B schematically illustrate two more examples of the source for broadband spectrally correlated light according to the invention. In the example of FIG. 7A, the source arrangement 500 includes a single non-collinear crystal 510 between two mirrors 511A and 511B; and a phase shaper arrangement formed by first and second double-sided mirrors 512 and 514. By moving at least one of the double-sided mirrors, a relative delay between the signal and idler is introduced in the backward propagation and automatically removed in the forward propagation. Pump light $L_{pump}$ passes through the crystal 510 and is converted into signal and idler fields $L_s$ and $L_i$ that are spatially separated from each other. In the example of FIG. 7B, the OPO arrangement 600 utilizes two spaced-apart collinear crystals 610A and 610B accommodated between two mirrors 611A and 611B, wherein the crystal 610A is pumped and crystal 610B is unpumped, and includes a phase shaper arrangement in the form of positive- and negative-delay units 612 and 614 at opposite input/output sides of the crystal 610B. The light propagation through the OPO arrangements 500 and 600 is shown in a self-explanatory manner.

Figure 7C:
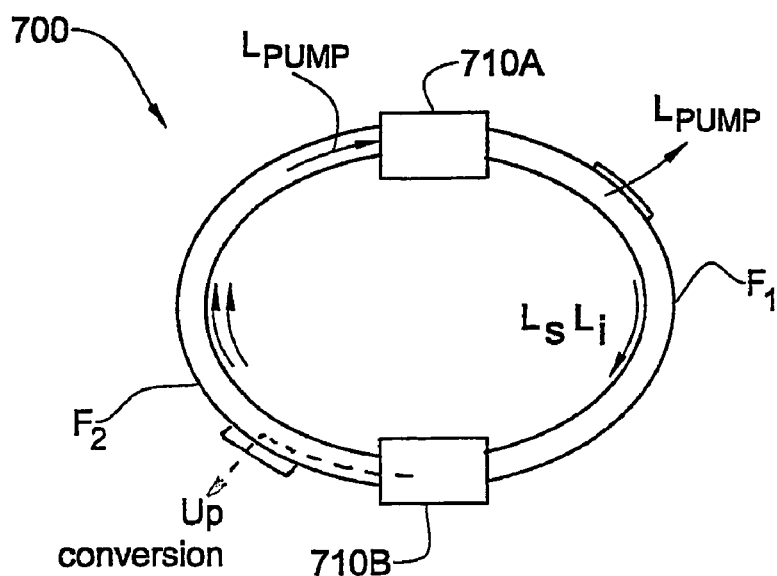

The ring cavity configuration of FIG. 7B can be implemented in a fiber. This is schematically illustrated in FIG. 7C showing a source arrangement 700, in which two non-linear crystals 710A and 710B are located in a spaced-apart relationship and coupled to each other via two optical fiber segments $F_1$ and $F_2$ forming a ring cavity. The fiber segments $F_1$ and $F_2$ are designed to apply, respectively, positive and negative dispersion to light passing therethrough. The crystal 710A is pumped to emit down converted fields, and pumping light $L_{pump}$ may then be removed from the cavity by placing a Bragg reflector onto the fiver core as a respective region.

Figure 7D:
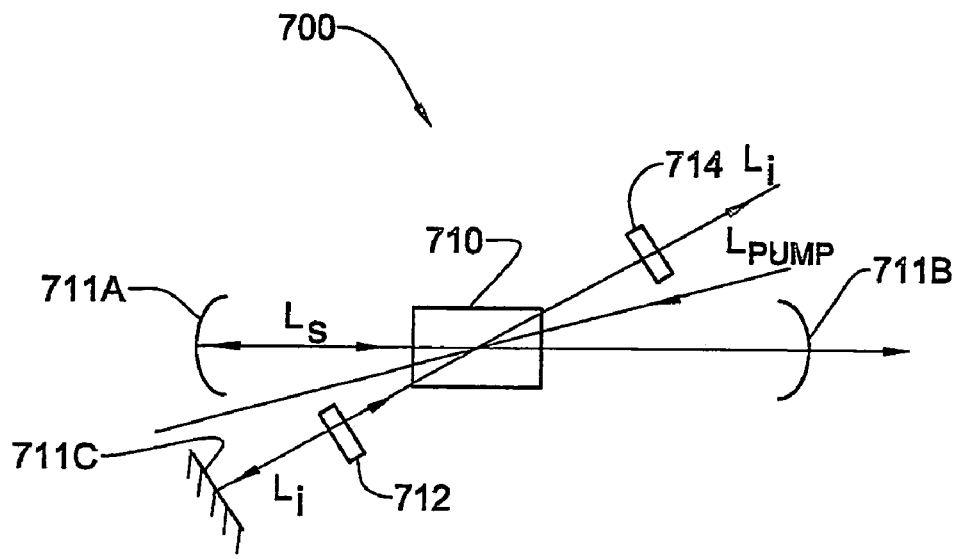
FIGS. 7D and 7E schematically illustrate examples of a linear cavity singly resonant OPO source according to the invention.
Figure 7E:
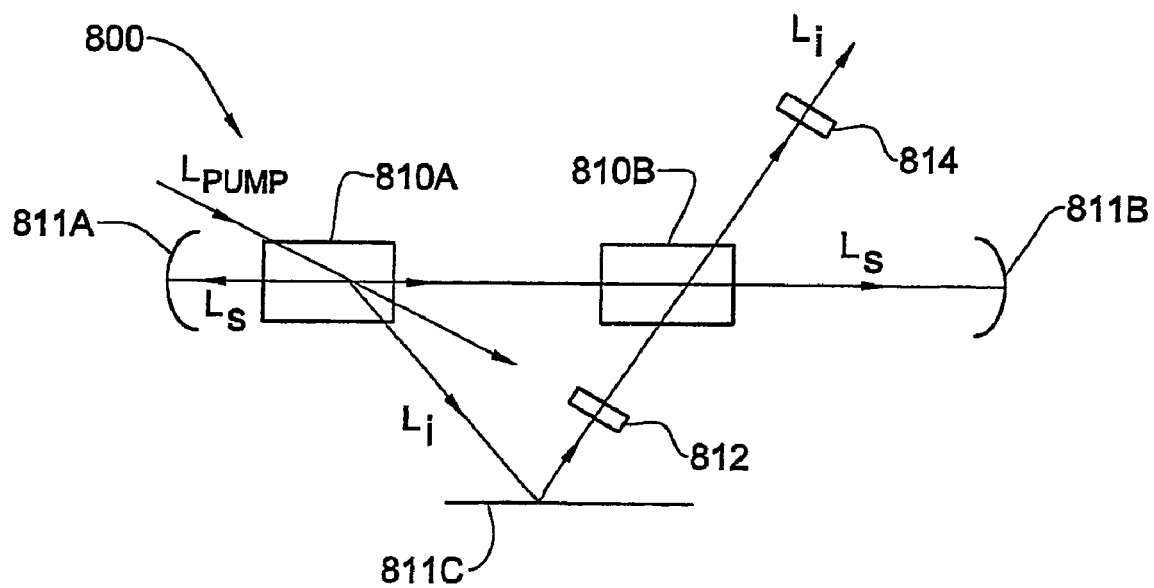

Some other possible implementation of the light source arrangement is according to the invention are shown in FIGS. 7D and 7E. These examples present singly-resonant, non-collinear configurations.

In the example of FIG. 7D, a source arrangement 700 comprises a resonant cavity formed by a non-collinear crystal (non-linear medium) 710 between two mirrors 711A and 711B, and comprises an additional mirror 711C and a phase shaper arrangement formed by two phase shaper units 712 and 714, all located outside the cavity. As shown a pump light beam $L_{pump}$ is directed through the crystal 710 and thus emits signal and idler fields $L_s$ and $L_i$ propagating along intersecting axes. Signal field $L_s$ is reflected from the mirror 711A to propagate back to the crystal 710. Idler field $L_i$ passes through the phase shaper unit 712, being thus phase-shifted with respect to the signal field, and is reflected from the mirror 711C to propagate back to the crystal 710. The phase relation of the signal and idler fields is restored at the other side of the crystal by passing the idler through the inverse phase shaper unit 714.

A source arrangement 800 shown in FIG. 7E includes a resonant cavity formed by two crystals 810A and 810B between mirrors 811A and 811B, and includes a mirror 811C and two phase shaper units 812 and 814. The non-collinear crystal 810A is pumped by a light beam $L_{pump}$ and the so-emitted signal and idler fields $L_s$ and $L_i$ propagate towards, respectively, mirror 811A and 811C, and thus reflected towards crystals 810A and 810B. Idler field, while propagating to the crystal 810B, passes through the phase shaper unit 812, and thus up conversion of signal and idler fields in the crystal 810B is avoided. Idler field, after emerging from the crystal 810B, passes through the inverse phase shaper 814, and thus a phase relation between the output signal and idler fields is restored.

A periodically polled KTP can be selected as the non-linear medium, mainly due to its high non-linear constant and commercial availability and also due to the fact that phase matching can easily be controlled in this crystal by small temperature changes (a few degrees Celsius). The phase shaping units may be appropriately designed glass plates, optical fibers, spatial light modulators.

The source may also comprise a mechanism of the kind capable of actively changing the optical length of the cavity. This is associated with the fact that broadband down conversion occurs in the OPO cavity, only when the pump laser frequency coincides with a mode of the OPO cavity. With the conventional OPOs (where there is no need for broadband output), the OPO output modes are unequally spaced due to uncompensated dispersion of elements in the cavity, and as a result at any pump frequency, at least one pair of signal and idler components always exists. However, the OPO configuration of the present invention requires as many as possible signal/idler pairs, namely, almost zero total dispersion, and consequently equally spaced output modes. Accordingly, the spectral arrangements of the cavity modes should be such that the pump frequency falls on that of a mode of the cavity. To this end, either the pump is to be appropriately tuned or the optical length of the OPO cavity is to be locked to match the pump frequency. The feedback input for this cavity lock can be the output beam intensity. For example, an intra-cavity electro-optic modulator (EOM) can be used for this purpose, due to its ability to compensate for a large bandwidth of noise.

Figure 8:
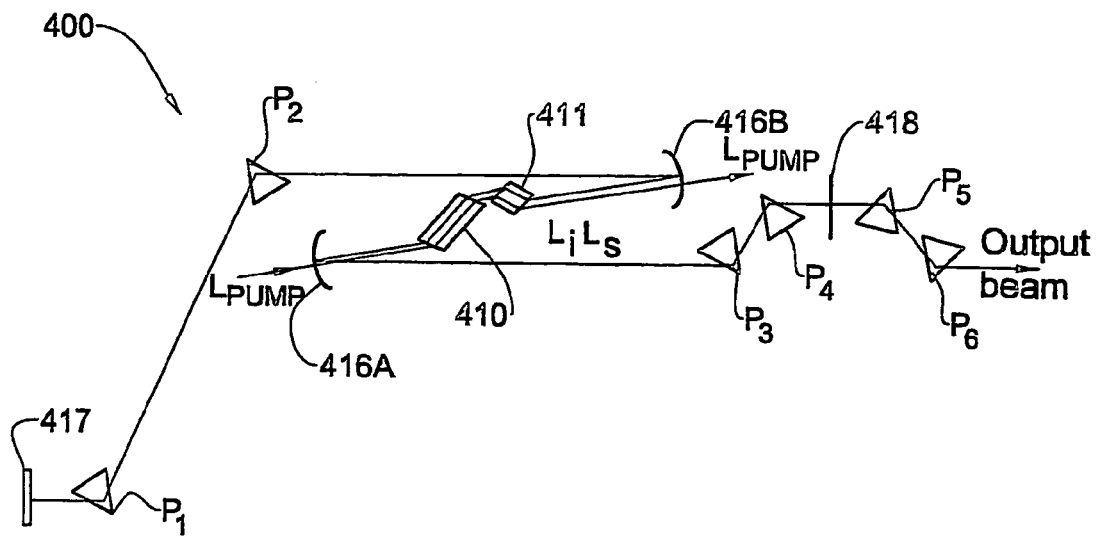
FIG. 8 more specifically exemplifies the layout of a collinear, doubly resonant OPO cavity configuration according to the invention, utilizing dispersion as the mechanism for controlling the phase relations inside the cavity.

FIG. 8 exemplifies a detailed layout of the OPO cavity configuration 400 of the present invention, utilizing dispersion as the mechanism for controlling the phase relations inside the cavity, due to the fact that both positive and negative dispersion with low loss can be obtained by the use of prism pairs in a symmetric Brewster angle configuration. The set up 400 comprises a gain medium (non-linear crystal) 410; EOM unit 411; mirrors 416A and 416B; a highly reflective element 417; tunable negative dispersion elements (prisms) $P_1$, $P_2$; tunable positive dispersion prisms $P_3$, $P_4$ and an output beam coupler 418. Prisms $P_5$, $P_6$ are used to rearrange the output beam to be identical to the undispersed beam inside the cavity. This configuration provides for obtaining about 50 nm bandwidth of oscillation around 1064 nm.

The above source configurations provide for controlling the amount of reduced loss. Hence, almost doubling of the efficiency of the OPO for broadband oscillations is provided, compared to an OPO without mode competition suppression.

The inventors have performed detailed theoretical and experimental analysis showing the feasibility of a low threshold high efficiency broadband OPO. The dependence of the conversion efficiency on the bandwidth of oscillation for the OPO configuration of FIG. 6A (assuming steady state operation) have been analyzed, based on the analysis of the threshold pump intensity and conversion efficiency for the case of monochromatic signal and idler, presented in [2], Ch. 9, pp. 117-140. More specifically, a similar analysis for a broadband signal and idler with the mode competition suppression scheme of FIG. 6A has been carried out.

Assuming that the depletion of the pump is low, the pump amplitude $A_p^+[l]$, after passing through the non-linear medium of length l, is as follows:

$$A_p^+[l] = A_p^+[0] - lk \int A_s^+(\omega) A_I^+(\omega_p - \omega) \, d\omega \quad (17)$$

wherein $A_s^+(\omega)$ is the forward propagating component of the signal field at frequency $\omega$ ("+" denoting forward propagation), $A_p^+[0]$ is the pump amplitude entering the medium, and the assumption is made that the non-linear coupling constant k is independent of frequency, which is a reasonable assumption for frequencies close to the degeneracy point.

Similarly, the back propagating up conversion amplitude is:

$$A_p^-[0] = lk \int A_s^-(\omega) A_I^-(\omega_p - \omega) \, d\omega \quad (18)$$

When the reflectively of the output coupler is the same for both the signal and the idler, the cavity conditions are symmetric for both. Under these conditions, the forward propagating idler field is a complex conjugate of the signal field, while the backward propagating idler has an additional phase that results from the relative delay $\tau$ in the cavity:

$$A_I^+(\omega_p - \omega) = (A_s^+(\omega))^*$$

$$A_I^-(\omega_p - \omega) = (A_s^-(\omega))^* \exp[i\omega\tau] \quad (19)$$

When other phase control mechanisms are used, such as dispersion, equation (19) is to be modified accordingly (without affecting the analysis).

Incorporating equation (19) into equations (17) and (18), yields:

$$A_p^+[l] = A_p^+[0] - lk \int |A_s^+(\omega)|^2 d\omega \quad (20)$$

$$A_p^-[0] = lk \int |A_s^-(\omega)|^2 \exp[i\omega\tau] d\omega \quad (21)$$

If the gain in the cavity is not very high, the signal and idler field can be approximated at any frequency to be a standing wave of constant intensity $$|A_s^+(\omega)| \approx |A_s^-(\omega)|$$

and the superscript +/− sign can therefore be dropped.

Defining the function $F(\tau)$ as $$F(\tau) \equiv \int |A_s(\omega)|^2 \exp[i\omega\tau] d\omega \quad (22)$$

we obtain:

$$A_p^+[l] = A_p^+[0] - lkF(0) \quad (23)$$

$$A_p^-[0] = lkF(\tau) \quad (24)$$

which is what is obtainable for the conventional doubly resonant OPO configuration.

It should be noted that $F(0) = \int |A_s(\omega)|^2 d\omega$ is proportional to the number of signal photons in the cavity, which is equal to the number of down converted photon pairs.

An energy conservation equation can now be written, based on that in steady state the number of photons per second lost from the pump is equal to the number of signal-idler photon pairs leaving the cavity per second:

$$|A_p^+[0]|^2 - |A_p^+[l]|^2 - |A_p^-[0]|^2 = TF(0) \quad (25)$$

where T is the loss in the cavity, which is equal to the output coupler transmission in an ideal cavity.

Substituting equations (23) and (24) into equation (25), and performing some algebraic manipulations, yields:

$$\frac{TF(0)}{|A_p^+[0]|^2} = \frac{1}{1+\left|\frac{F(\tau)}{F(0)}\right|^2}\left[\frac{2T}{\kappa l A_p^+[0]} - \frac{T^2}{\kappa^2 l^2 |A_p^+[0]|^2}\right] \quad (26)$$

The left hand side of equation (26) can be identified as the conversion efficiency η, since it is just the number of down converted signal-idler photon pairs leaving the cavity per second divided by the number of incident pump photons per second. Since the perfect phase matching is assumed, the pump field can be taken as real, and recalling the expression for the threshold pump intensity [2, 3]

$$|A_{p-th}|^2 = T^2/4\kappa^2 l^2,$$

the equation (26) can be written as follows:

$$\eta = \frac{4}{1+\left|\frac{F(\tau)}{F(0)}\right|^2}\left[\left|\frac{A_{p-th}}{A_p^+[0]}\right| - \left|\frac{A_{p-th}}{A_p^+[0]}\right|^2\right] \quad (27)$$

Defining $$N \equiv I_p/I_{th} = |A_p^+[0]/A_{p-th}|^2$$

as the ratio between the actual pump intensity ($I_p$) and the threshold pump intensity ($I_{th}$), yields:

$$\eta = \frac{2}{1+\left|\frac{F(\tau)}{F(0)}\right|^2}\left[\frac{2}{\sqrt{N}} - \frac{2}{N}\right] \quad (28)$$

It should be noted that in the absence of relative delay (τ=0), equation (28) becomes:

$$\eta_0 = \frac{2}{N}\left[\sqrt{N}-1\right] \quad (29)$$

The above is the conventional result obtained with the double-resonant OPO with no mode competition suppression.

To determine the effect of adding relative delay in the cavity, the following considerations have been made. From equation (28), for two oscillations that have the same threshold (the same N), the dominant oscillation will be that of smaller F(τ) for any pumping power (for any N). The temporal width of F(τ) is inversely proportional to the spectral width of the oscillation, so the broader oscillation will dominate. Comparing the two limiting possibilities of a very narrow oscillation (where F(τ) is essentially independent of τ) and a very broad oscillation (where F(τ) tends to zero for π larger than the coherence time of the signal field), provides that the improvement in conversion efficiency approaches a factor of two, which is a considerable improvement.

In practice, it is expected that a broad oscillation will have a higher threshold. Thus, when the pump power is low, narrow oscillations will dominate. But, as the pump power increases high above the threshold, the situation becomes more and more favorable for the broader oscillations.

Figure 9:
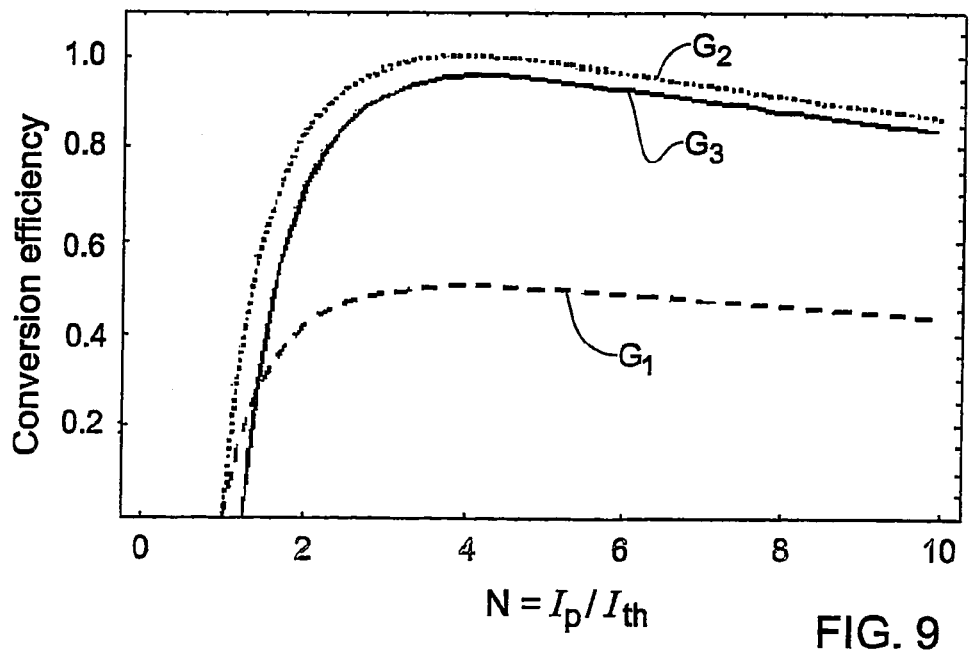
FIG. 9 illustrates calculated conversion efficiency as a function of $N=I_p/I_{th}$ ($I_p$ being the actual pump intensity and $I_{th}$ being the threshold pump intensity) for a very narrow oscillation, an ideal broadband oscillation, and a practical broadband oscillation.

FIG. 9 illustrates calculated conversion efficiency as a function of N (N=$I_p/I_{th}$) for a very narrow oscillation (graph $G_1$), ideal broadband oscillation (graph $G_2$) and practical broadband oscillation (graph $G_3$). The intensity $I_{th}$ is taken to be the minimum threshold intensity among all possible oscillations. For very broadband oscillations, where π can be tuned so F(τ) is negligible, the conversion efficiency can approach 100% around N=4, which is most desirable for many applications. It is thus evident that, in order to obtain broadband oscillations, it is desirable that the threshold for broad oscillations will be equal to the minimum threshold of the narrowband oscillation. In other words, since broadband oscillation can be decomposed into many signal-idler frequency pairs, it is desired that all these pairs will have the same threshold, i.e. the threshold intensity will be independent of wavelength.

Figure 10A:
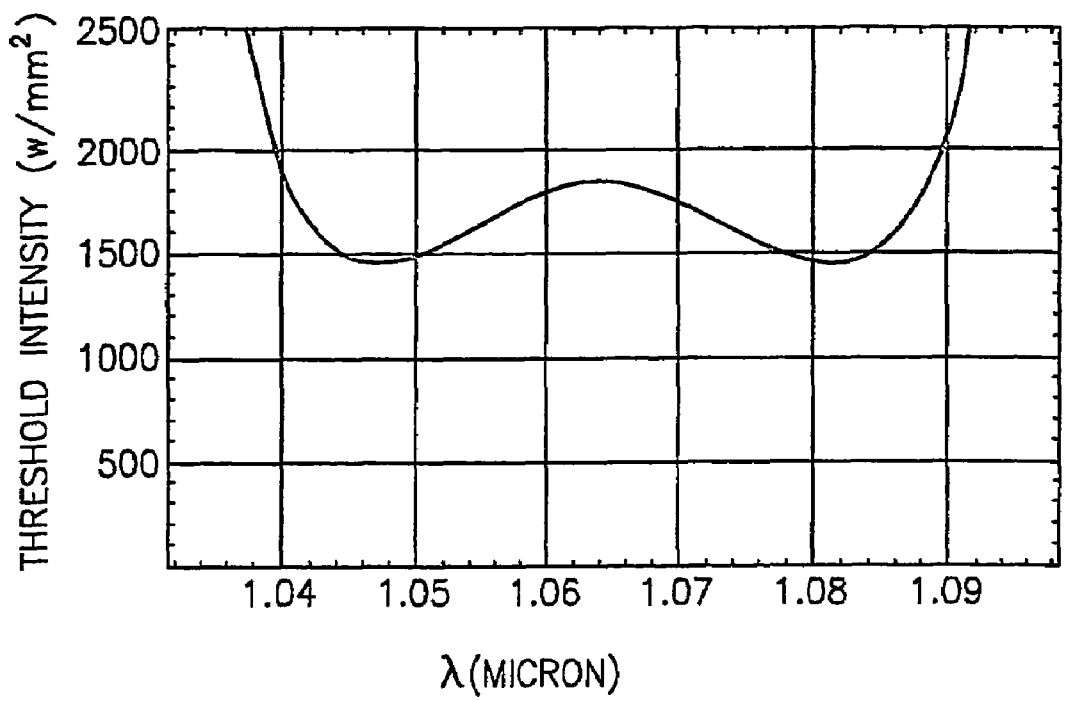
FIGS. 10A and 10B illustrate the threshold pump intensity ($I_{th}$) as a function of signal wavelength, for two cases of broad phase matching, respectively, i.e., for a 1 cm long PPKTP crystal with 2% loss in the cavity pumped by 532 nm in a broad phase matching configuration, and for a 1.4 cm long BBO crystal with 1% loss in the cavity pumped by 728 nm in a zero dispersion ultra broad phase matching configuration.
Figure 10B:
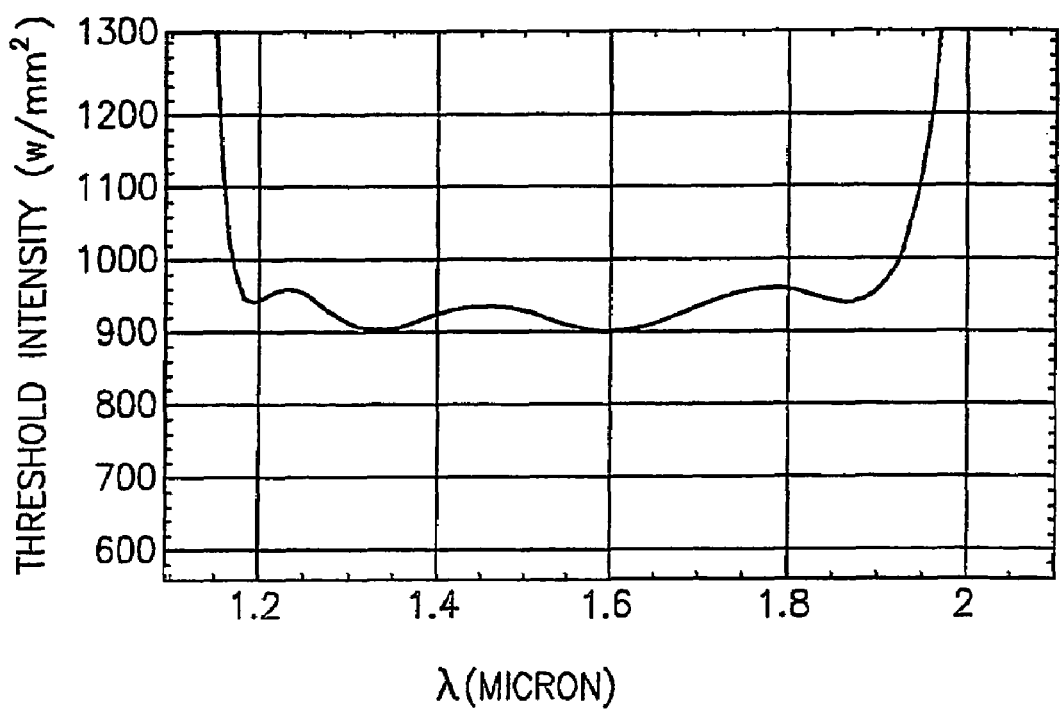

The above requirement can be met to a high degree. This is illustrated in FIGS. 10A-10B showing a calculation of threshold pump intensity ($I_{th}$) as function of signal wavelength, for the two cases of broad phase matching—for a 1 cm long PPKTP crystal with 2% loss in the cavity pumped by 532 nm in a broad phase matching configuration (FIG. 10A), and for a 1.4 cm long BBO crystal with 1% loss in the cavity pumped by 728 nm in a zero dispersion ultra broad phase matching configuration (FIG. 10B). It is evident that the threshold intensity is constant up to 15% over the entire phase matching bandwidth.

The above considerations demonstrate the need for and feasibility of the novel OPO configuration according to the invention. Generally, the light source of the present invention, due to its unique spectral and temporal characteristics, can be used in various applications, for example in non-linear microscopy and tomography where about 1 micron spatial resolution of ultra short pulses can be obtained at low CW intensities, avoiding the damaging peak intensities of pulses, or optical communications especially in the optical CDMA as the key generation source. The key encoding/decoding scheme of the present invention provides for its use in the optical CDMA multiplexer/demultiplexer.

Those skilled in the art will readily appreciate that various modifications and changes can be applied to the embodiments of the invention as hereinbefore exemplified without departing from its scope defined in and by the appended claims.

The invention claimed is:

1. A method for automatically generating a key and a conjugate key to be used in an optical code division multiple access system, the method comprising applying a down conversion process to pump input light to thereby produce down converted broadband signal and idler fields that are complex conjugates of each other, said signal and idler fields serving as the key and its conjugate.

2. The method of claim 1, wherein said down conversion process comprises passing the pump light through a non-linear optical medium.

3. The method of claim 1, wherein said down conversion process comprises passing the pump light through an optical arrangement having a resonant cavity formed by at least one non-linear optical medium between two reflectors.

4. The method of claim 3, comprising reducing an effect of up conversion of the down converted light fields propagating through the resonant cavity.

5. The method of claim 4, wherein said reducing of the up conversion effect comprises applying a spectral phase shaping to at least one of the down converted light fields while propagating through the optical arrangement.

6. The method of claim 5, wherein said spectral phase shaping comprises introducing a relative delay between the down converted signal and idler fields emerging from the non-linear medium, and restoring the phase relation of the signal and idler fields prior to further passing through the non-linear medium.

7. The method of claim 6, wherein said relative delay is of the order of the coherence time of the respective down converted field $\tau=1/\Delta\omega$, wherein $\Delta\omega$ is the spectral width of the down converted light.

8. The method of claim 1, wherein said down conversion process is carried out at a data transmitting side.

9. The method of claim 1, wherein said down conversion process is carried out at a data receiving side.

10. A method for use in an optical code division multiple access (CDMA) system, the method comprising: applying a down conversion process to a light channel that is to be used for carrying data from a data transmitting system to a data receiving system, said down conversion of the light channel automatically producing broadband signal and idler light fields that are complex conjugates of each other and therefore serve as a key and its conjugate, thereby enabling data modulation of at least one of the signal and idler fields and processing them together by applying an up conversion process to thereby extract the data.

11. A method for use in an optical code division multiple access (CDMA) system, the method comprising at least one of the following:
   applying a down conversion process to a light channel that is to be used for carrying data from a data transmitting system to a data receiving system, said down conversion of the light channel automatically producing broadband signal and idler light fields that are complex conjugates of each other and therefore serve as a key and its conjugate, thereby enabling modulation of at least one of the signal and idler fields with said data and processing the signal and idler fields together to extract the data; and
   applying an up conversion process to data-carrying light, containing down conversion signal and idler fields presenting an optical channel, thereby restoring light indicative of the data channel in a data receiving system.

12. The method of claim 10, wherein said down conversion process is applied to the light channel in the data receiving system, and one of the signal and idler fields is transmitted from the receiving system to the data transmitting system, thereby enabling the data modulation of said one of the signal and idler fields at the data transmitting system.

13. The method of claim 10, wherein said down conversion process is applied to the light channel in the data transmitting system.

14. The method of claim 11, wherein said down conversion process is applied to the light channel in the data receiving system, and one of the signal and idler fields is transmitted from the receiving system to the data transmitting system, thereby enabling the data modulation of said one of the signal and idler fields at the data transmitting system.

15. The method of claim 11, wherein said down conversion process is applied to the light channel in the data transmitting system.

16. A method for producing an optical channel in an optical code division multiple access (CDMA) system, the method comprising: applying a down conversion process to input light, to be used for carrying data from a data transmitting system to a data receiving system, said down conversion process producing down converted signal and idler light fields that are complex conjugates of each other and therefore present a key and its conjugate, thereby enabling uniquely affecting a spectral phase of at least one of the signal and idler fields to define a unique phase relation between the signal and idler fields, and enabling extraction of data by utilizing an up conversion process.

17. A method for producing an optical channel in an optical code division multiple access (CDMA) system, the method comprising:
   (i) applying a down conversion process to input light, to be used for carrying data from a data transmitting system to a data receiving system, said down conversion process producing down converted signal and idler light fields that are complex conjugates of each other and therefore present a key and its conjugate;
   (ii) uniquely affecting a spectral phase of at least one of the signal and idler fields to thereby define a unique phase relation between the signal and idler fields, thereby enabling extraction of data by utilizing an up conversion process.

18. The method of claim 16, wherein one of the signal and idler fields is used for data modulation, said uniquely affecting of the spectral phase is applied to said one of the signal and idler fields.

19. The method of claim 16, wherein one of the signal and idler fields is used for data modulation, said uniquely affecting of the spectral phase is applied to the other one of the signal and idler fields.

20. The method of claim 18, wherein said down conversion process is carried in the data transmitting signal which carries out the data modulation.

21. The method of claim 19, wherein said down conversion process is carried in the data receiving signal.

22. The method of claim 19, wherein said down conversion process is carried in the data transmitting signal which carries out the data modulation.

23. The method of claim 16, comprising operating the data receiving system to carry out the following:
   applying said down conversion process, transmitting one of the signal and idler fields to the data transmitting system, thereby enabling the data transmitting system to modulate said one of the signal and idler fields with the respective data, a certain distance between the data receiving and data transmitting systems defining said unique phase relation between the signal and idler fields, applying the unique effect of the spectral phase to the other one of the signal and idler fields; and upon receiving the data modulated field applying the up conversion process to the spectral phase affected data modulated field and the other spectral is phase affected field.

24. The method of claim 16, comprising operating the data transmitting system to carry out the following:
   applying said down conversion process;
   modulating one of the signal and idler fields with the respective data;
   carrying out said uniquely affecting of the spectral phase of at least one of the signal and idler fields to thereby define the unique phase relation between the signal and idler fields; and transmitting the signal and idler fields to the data receiving system, to thereby enable said data receiving system to utilize said unique phase effect value to one of received fields to thereby restore the phase relationship between the fields, and to apply the up conversion process to the received fields.

25. The method of claim 16, wherein said phase effecting includes one of the following: relative delay, material dispersion, spectral phase filtering based on pulse shaping.

26. The method of claim 25, wherein the unique delay value is of the order of the coherence time of the respective field $\tau=1/\Delta\omega$, wherein $\Delta\omega$ is the spectral width of the down converted light.

27. The method of claim 16 comprising modulating at least one of the signal and idler fields in accordance with data to be carried by the optical channel.

28. The method of claim 16, wherein said extraction of data in the data receiving system comprises: affecting a spectral phase of at least one of the signal and idler fields by using the unique phase effect value, thereby restoring a phase relation of the signal and idler fields of the specific channel; and then applying the up conversion process to light, containing the phase-affected signal and idler fields, to thereby enable separation of said channel from a remaining portion of the light.

29. A method of multiplexing optical channels comprising:
producing N optical channels, $N \geq 1$, the optical channel being represented by a pair of down converted signal and idler light fields that are complex conjugates of each other and present a key and its conjugate, thereby enabling modulation of the optical channel in accordance with corresponding data to be carried by said optical channel;
applying to at least one of the signal and idler fields of the same channel a unique phase effect value to thereby define a unique phase relation between the signal and idler fields for the channel, thereby enabling demultiplexing of light in a data receiving system to extract a specific channel by utilizing the respective unique phase effect and an up conversion process.

30. The method of claim 29, wherein said phase effecting includes one of the following: relative delay, material dispersion, spectral phase filtering based on pulse shaping.

31. The method of claim 30, wherein the unique delay is of the order of the coherence time of the respective field $\tau=1/\Delta\omega$, wherein $\Delta\omega$ is the spectral width of the down converted light.

32. The method of claim 30, wherein a difference between the unique delays associated with different channels is longer than the correlation length of the signal and idler fields.

33. The method of claim 29, wherein said N optical channels share the same pair of signal and idler fields.

34. The method of claim 33, wherein said N optical channels are produced by pumping a single non-linear light source with pump light to thereby produce down converted broadband signal and idler light portions that are complex conjugates of each other, and splitting one of the signal and idler portions into the N spatially separated light components.

35. The method of claim 33, wherein said N optical channels are produced by seeding N light sources by one noise source, thus causing all the sources to generate the same signal and idler light fields.

36. The method of claim 29, wherein each of said N optical channels has its own set of signal and idler light fields.

37. The method of claim 36, wherein said N optical channels are produced by pumping N uncorrelated light sources to thereby produce N pairs of the signal and idler light components, respectively.

38. The method of claim 29, comprising applying data modulation to either one of the signal and idler light fields of the channel.

39. The method of claim 29, wherein the producing of the optical channel represented by the pair of down converted signal and idler light fields and the application of the unique phase effect value to at least one of the fields are carried out in a data transmitting system.

40. The method of claim 29, wherein the optical channel represented by the pair of down converted signal and idler light fields is produced in the data receiving system.

41. The method of claim 40, wherein said application of the unique phase effect value to the light field to be modulated with certain data is implemented by a predefined distance between the data receiving and data transmitting systems, and an inverse value of said unique phase effect value is applied to the other field in the data receiving system.

42. The method of claim 29, comprising demultiplexing light in a data receiving system for extracting the specific channel, said demultiplexing comprising:
affecting a phase of at least one of the signal and idler fields in the received light by using an inverse value of said unique phase effect corresponding to said specific channel, to thereby restore phase relation between the signal and idler fields of the specific channel to allow an up conversion process;
applying the up conversion process to thereby enable restoration and extraction of said specific channel.

43. The method of claim 42, comprising applying said unique phase effect value to a remaining portion of at least one of the signal and idler fields in the up converted light and allowing transmission of the remaining fields to receiver systems.

44. A method for use in an optical code division multiple access, the method comprising:
producing N optical channels each presented by a key and its conjugate in the form of signal and idler down converted light components that are complex conjugates of each other, thereby enabling modulation each of the channels in accordance with respective data to be carried by the channel; uniquely encoding each of the channels by phase affecting at least one of the signal and idler components of the channel using a unique value of the phase effect different from those applied to the other channels to thereby define a unique phase relation between the signal and idler fields of each channel, and allowing transmission of the down converted components towards receiving systems to thereby enable extracting the specific channel from all other channels in the respective one of the receiving systems by separating between the signal and idler fields, affecting a phase of at least one of the signal or idler fields using an inverse value of the unique phase effect corresponding to said specific channel to thereby restore a phase relation between the signal and idler fields of the specific channel; and applying an up conversion to the received light, thereby restoring the specific optical channel and enabling its separation from a remaining part of the received light.

45. A method for use in an optical code division multiple access, the method comprising:
  producing by each of data receiving systems an optical channel presented by a key and its conjugate in the form of signal and idler down converted light components that are complex conjugates of each other and transmitting one of said fields through a transmitting channel to be received in a corresponding data transmitting system, thereby allowing data modulation of said one of the fields in the data transmitting system and returning the modulated field to the data receiving system, a predefined distance between the corresponding data receiving and data transmitting systems resulting in application of a unique value of the phase effect value to said one of the fields defining a unique phase relation between the signal and idler fields of said channel;
  applying an inverse value of said unique phase effect value to the other field; and
  upon receiving the returned modulated phase affected field, applying an up conversion process to both of the fields to thereby extract said data.

46. The method of claim 44, comprising applying said unique phase effect to the other of the signal and idler fields in the remaining part of the up converted light, and allowing transmission of the remaining light to receiving systems.

47. An optical multiplexer system comprising:
  a light source arrangement for producing N optical channels each represented by down converted signal and idler fields that are complex conjugates of each other and represent key and its conjugate fields;
  a phase affecting utility accommodated in the optical paths of the key fields and operable to apply a unique phase effect value to each of the key fields different from those applied to the other key fields;
  an output coupler for combining the phase affected key fields and the conjugate key fields to allow their transmission through an optical network.

48. An optical demultiplexer system operable for receiving input multi-channel light and extract therefrom a specific optical channel, the system comprising:
  a frequency filter for spatially separating between down converted signal and idler fields in the received light, said signal and idler fields being indicative of key and its conjugate of the specific channel;
  a phase affecting utility preprogrammed to affect a phase of the conjugate field by applying thereto an inverse value of a predetermined unique phase effect corresponding to the specific channel; and
  a light source arrangement operating to apply an up conversion process to the down converted fields, thereby enabling extraction of the specific channel.

49. An optical multiplexer/demultiplexer system comprising:
  a light source arrangement operating to apply a down conversion process to light intended to carry data of a specific optical channel, down converted light including signal and idler fields that are complex conjugates of each other and represent key and its conjugate fields of the specific channel;
  a frequency filter for spatially separating between the down converted signal and idler fields;
  a phase affecting utility operable to apply a unique phase effect value to a light field;
  a light source arrangement operating to apply an up conversion process to the down converted fields, thereby enabling extraction of the specific channel.

50. A source for generating a broadband key and its conjugate to be used as an optical channel in a code division multiple access system, the source comprising a non-linear optical arrangement operable to receive input light and produce output down converted signal and idler fields being complex conjugates of each other and therefore presenting the key and its conjugate.

51. The source of claim 50, wherein said arrangement comprises a resonant cavity formed by at least one non-linear medium between two mirrors, and a phase shaper arrangement operable to effect spectral phase of at least one of the down converted light fields to thereby introduce a certain phase relation between the down converted fields and reduce an effect of up conversion for broadband oscillations of the down converted light fields while propagating through said arrangement.

52. The source of claim 51, wherein said phase shaper is configured to introduce a relative delay between the down converted fields emitted by the non-linear medium, and restore the phase relation of the fields prior to further passing through said medium while propagating through the resonant cavity.

53. The source of claim 52, wherein said relative delay is of the order of the coherence time of the respective down converted field $\tau=1/\Delta\omega$, wherein $\Delta\omega$ is the spectral width of the down converted light.

54. The source of claim 51, comprising the single non-linear medium, and two phase shaper units accommodated, respectively, upstream and downstream of said non-linear medium.

55. The source of claim 51, comprising a first non-linear medium pumped by the input light to produce the down converted fields, a second non-linear medium in the optical path of the down converted fields, and two phase shaper units accommodated at opposite input/output sides of the second medium.

56. A method for producing broadband down converted light fields, the method comprising passing input light through a resonant non-linear optical arrangement, and affecting phases of down converted light fields while propagating through said arrangement to reduce an effect of up conversion for broadband oscillations of said down converted fields.

57. A source for broadband spectrally correlated light, the source comprising a resonant non-linear optical arrangement having a cavity with at least one non-linear optical medium between two mirrors, and a phase shaper arrangement, said phase shaper arrangement being operable to introduce a certain phase relation between the down converted fields and reduce an effect of up conversion of down converted light propagating through the optical arrangement.

58. The source of claim 57, wherein said phase shaper arrangement is operable to introduce a relative delay or dispersion between the signal and idler fields.

59. The arrangement of claim 57, wherein said cavity comprises a single non-linear optical medium to be pumped by input light to emit down converted signal and idler light fields, and two phase shaper units accommodated, respectively, upstream and downstream of said medium.

60. The arrangement of claim 57, wherein said cavity comprises a first non-linear medium to be pumped by input light to emit the down converted light fields, a second non-linear medium in the optical path of said down converted fields, and two phase shaper units accommodated at opposite input/output sides, respectively, of said second medium.

* * * * *